(12) United States Patent
Suwa et al.

(10) Patent No.: US 9,810,392 B2
(45) Date of Patent: Nov. 7, 2017

(54) VEHICLE HEADLIGHT DEVICE

(71) Applicant: MITSUBISHI ELECTRIC CORPORATION, Tokyo (JP)

(72) Inventors: Masashige Suwa, Tokyo (JP); Ritsuya Oshima, Tokyo (JP); Muneharu Kuwata, Tokyo (JP); Atsushi Michimori, Tokyo (JP); Kuniko Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 288 days.

(21) Appl. No.: 14/434,469

(22) PCT Filed: Oct. 10, 2013

(86) PCT No.: PCT/JP2013/006045
§ 371 (c)(1),
(2) Date: Apr. 9, 2015

(87) PCT Pub. No.: WO2014/057681
PCT Pub. Date: Apr. 17, 2014

(65) Prior Publication Data
US 2015/0267888 A1    Sep. 24, 2015

(30) Foreign Application Priority Data

Oct. 11, 2012 (JP) .................. 2012-226230

(51) Int. Cl.
*F21V 17/02* (2006.01)
*F21S 8/10* (2006.01)
*B62J 6/02* (2006.01)

(52) U.S. Cl.
CPC ............ *F21S 48/1721* (2013.01); *B62J 6/02* (2013.01); *F21S 48/1163* (2013.01); *F21S 48/125* (2013.01); *F21S 48/1258* (2013.01)

(58) Field of Classification Search
USPC ........................................ 362/512, 509, 475
See application file for complete search history.

(56) References Cited

U.S. PATENT DOCUMENTS 5,599,085 A    2/1997    Tabata et al.
5,975,732 A    11/1999   Tabata et al.
(Continued)

FOREIGN PATENT DOCUMENTS

CN    201162981 Y    12/2008
CN    101761847 A    6/2010
(Continued)

OTHER PUBLICATIONS

Office Action dated Aug. 1, 2016 in counterpart Chinese Patent Application No. 201380062825.1 with partial English Translation.

*Primary Examiner* — Edwyn Labaze
(74) *Attorney, Agent, or Firm* — Birch, Stewart, Kolasch & Birch, LLP

(57) ABSTRACT

A vehicle headlight device 100 according to the present invention includes a first lamp 92 that has a light source 211, an optical system 21, a rolling mechanism 50, and a control circuit 60. The optical system 21 includes a first wedge prism 30 and a second wedge prism 40 in which an incident ray from the light source 211 is deflected and projected. The rolling mechanism 50 rotates the first wedge prism 30 about a rotation axis. The control circuit 60 controls the rolling mechanism 50 so that the first wedge prism 30 is rotated in a direction opposite to a vehicle bank direction in accordance with a vehicle bank angle d. The first wedge prism 30 and the second wedge prism 40 are disposed so that their surfaces perpendicular to the rotation axis face each other. The first wedge prism 30 is disposed so that a wedge angle a1 directs in a road surface direction. The first wedge prism 30 is disposed so as to be rotatable about the rotation axis.

8 Claims, 24 Drawing Sheets

(56) References Cited

U.S. PATENT DOCUMENTS

| | | |
|---|---|---|
| 8,342,723 B2 | 1/2013 | Mochizuki |
| 8,919,197 B2 | 12/2014 | Sakamoto et al. |
| 2004/0218401 A1* | 11/2004 | Okubo .................. B60Q 1/085 362/526 |
| 2008/0175129 A1* | 7/2008 | Tanaka ................. G11B 7/1353 369/112.23 |
| 2010/0165653 A1 | 7/2010 | Ookubo et al. |
| 2011/0216548 A1* | 9/2011 | Fritz ....................... B60Q 1/12 362/466 |
| 2012/0063147 A1 | 3/2012 | Quadri et al. |
| 2013/0148369 A1 | 6/2013 | Haest |
| 2013/0241761 A1* | 9/2013 | Cooper ................. G01S 7/4812 342/54 |
| 2014/0185119 A1* | 7/2014 | Staver ................. G02B 27/0025 359/211.3 |
| 2015/0023019 A1* | 1/2015 | Chen .................. H05B 33/0803 362/276 |
| 2015/0204504 A1 | 7/2015 | Suwa et al. |

FOREIGN PATENT DOCUMENTS

| | | |
|---|---|---|
| CN | 102192456 A | 9/2011 |
| CN | 202125883 U | 1/2012 |
| CN | 102588764 A | 7/2012 |
| CN | 104602997 A | 5/2015 |
| DE | 701365 C | 1/1941 |
| EP | 2 366 940 A2 | 9/2011 |
| FR | 606316 A | 6/1926 |
| FR | 2 844 759 A1 | 3/2004 |
| JP | 57-82001 U | 5/1982 |
| JP | 60-47738 A | 3/1985 |
| JP | 63-151591 A | 6/1988 |
| JP | 5-139203 A | 6/1993 |
| JP | 6-261242 A | 9/1994 |
| JP | 9-277974 A | 10/1997 |
| JP | 10-149702 A | 6/1998 |
| JP | 10-228063 A | 8/1998 |
| JP | 2000-187180 A | 7/2000 |
| JP | 2001-91402 A | 4/2001 |
| JP | 2001-347977 A | 12/2001 |
| JP | 2002-277549 A | 9/2002 |
| JP | 2002-277812 A | 9/2002 |
| JP | 2003-121764 A | 4/2003 |
| JP | 2008-41385 A | 2/2008 |
| JP | 2008-222178 A | 9/2008 |
| JP | 2009-120057 A | 6/2009 |
| JP | 2012-66683 A | 4/2012 |
| WO | WO 2012/022658 A1 | 2/2012 |

\* cited by examiner

VEHICLE HEADLIGHT DEVICE

TECHNICAL FIELD

The present invention relates to a vehicle headlight device that provides a driver with an adequate light distribution.

BACKGROUND ART

A headlamp for a motorcycle is disclosed in which means for rotating a light distribution area in a direction opposite to a vehicle body bank direction is employed so that a wide visual field can be secured even at cornering during night driving (for example, see Patent Document 1). In this Description. "light distribution" means a spatial distribution of light projected from a light source.

Another headlamp for a motorcycle is disclosed in which a plurality of lamps is equipped and a visual field is secured by sequentially turning on each of the lamps depending on a vehicle body bank angle (for example, see Patent Document 2).

PRIOR ART DOCUMENT

Patent Document

Patent Document 1: Japanese Unexamined Patent Application Publication No. 2001-347977 (P. 2-P. 3, FIG. 8)
Patent Document 2: Japanese Unexamined Patent Application Publication No. 2009-120057 (P. 3. FIG. 1)

SUMMARY OF THE INVENTION

Problem that the Invention is to Solve

In a conventional technology disclosed in Patent Document 1, when a vehicle goes through a curve, a light distribution area is rotated so that the light distribution area contains a direction in which a line of sight of a driver is directed. However, an area where the line of sight of driver is directed is illuminated by a ray in an area away from a central portion of the light distribution area. Or, a ray in the light distribution area illuminates only a part of the area where the line of sight of driver is directed. Therefore, there has been a problem that it is difficult for a head lamp shown in Patent Document 1 to brightly illuminate the area where the line of sight of driver is directed. "Vehicle goes through a curve", described later, means that a vehicle etc. changes its travelling direction in a curve.

In a conventional technology disclosed in Patent Document 2, since lamps are fixed, there has been a problem that an illumination area cannot be changed continuously in accordance with a change in a vehicle body bank angle.

A vehicle headlight device according to the present invention has been invented in order to solve the above-described problems, and the device can brightly illuminate an area where the line of sight of driver is directed when a vehicle body goes through a curve. In addition, the vehicle headlight device according to the present invention can continuously change its illumination area in accordance with a change in a vehicle body bank angle. Note that the headlight device has a meaning same with the head lamp and the lamp. Here, when the headlight device is configured with a plurality of lamps, each of the lamps is called as "a lamp".

Means for Solving the Problem

A vehicle headlight device according to the present invention comprises a first lamp that includes: a first light source; an optical system that has a first wedge prism and a second wedge prism for receiving, deflecting, and projecting a ray from the first light source; a rolling mechanism that rotates the first wedge prism about a rotation axis; and a control circuit that controls the rolling mechanism so that the first wedge prism is rotated in a direction opposite to a bank direction in accordance with a bank angle of a vehicle, wherein the first wedge prism and the second wedge prism are disposed so that their surfaces perpendicular to the rotation axis face each other; and the first wedge prism is disposed so that a wedge angle directs in a road surface direction and is disposed so as to be rotatable about the rotation axis.

Advantageous Effects of the Invention

In a vehicle headlight device according to the present invention, since an illumination area can be shifted depending on a vehicle bank angle, a direction in which the line of sight of driver is directed can be brightly illuminated when a vehicle goes through a curve. In addition, the illumination area can be continuously changed in accordance with a change in a vehicle body bank angle.

MODE FOR CARRYING OUT THE INVENTION

Figure 22:
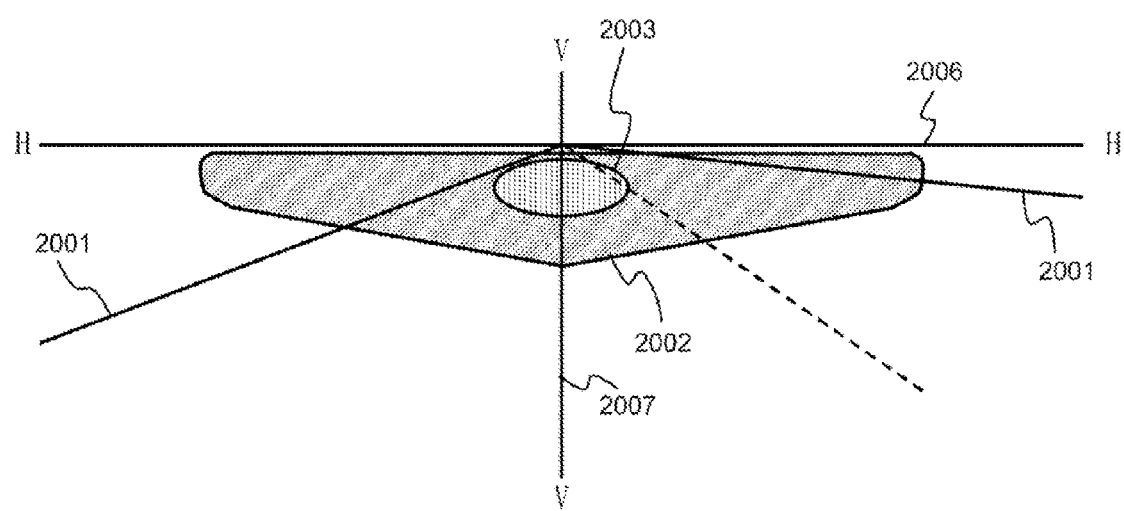
FIG. 22 is a diagram explaining a light distribution area of a headlight device.
Figure 23:
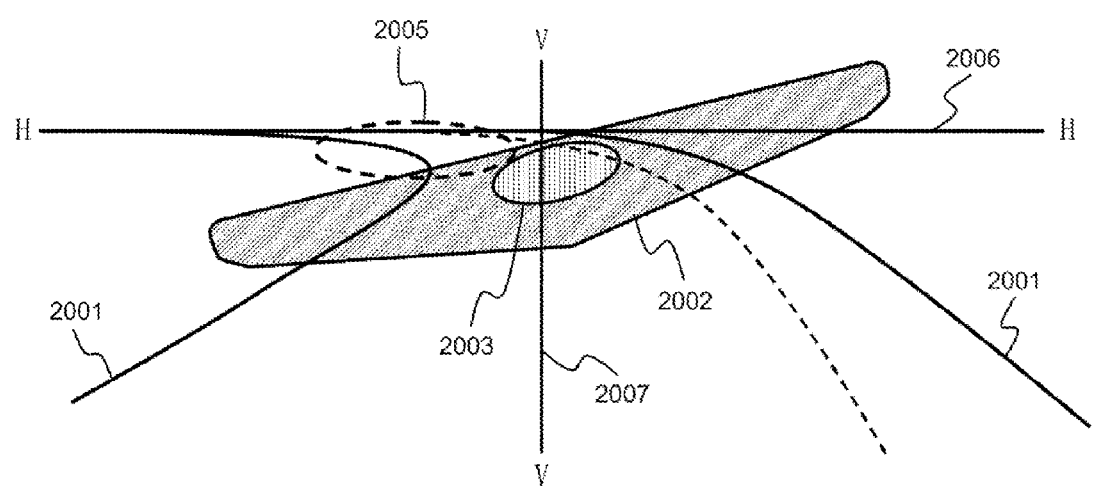
FIG. 23 is another diagram explaining the light distribution area of the headlight device.
Figure 24:
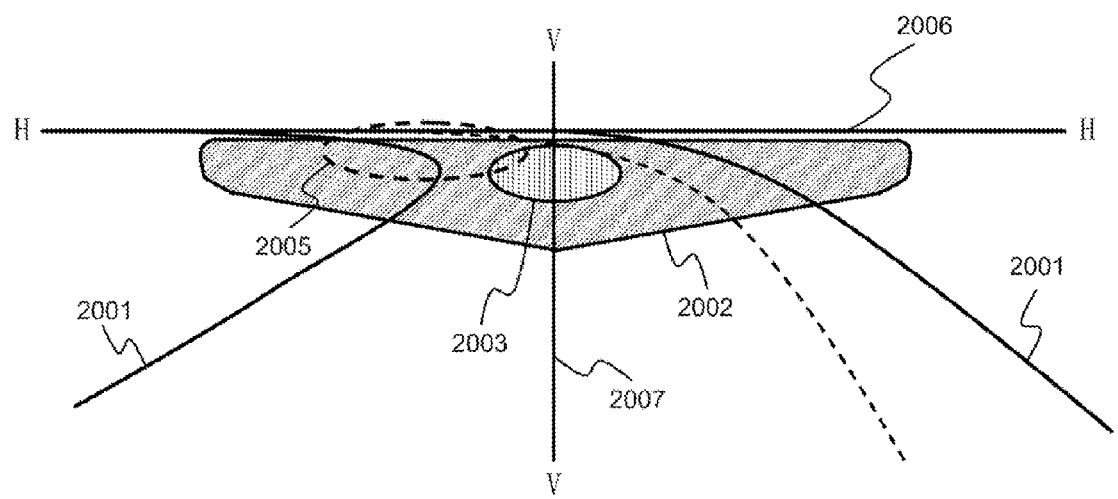
FIG. 24 is another diagram explaining the light distribution area of the headlight device.

A light distribution area of a headlight device for a vehicle (for example, motorcycle), including an illuminance distribution, will be explained. FIGS. 22, 23, and 24 are diagrams explaining the light distribution area of headlight device. FIGS. 22, 23, and 24 are the diagrams when a driver who is positioned in a front side relative to the sheet and at a perpendicular V-V, looks at a horizon 2006. In FIGS. 22, 23, and 24, a straight line 2007 perpendicular to the ground coincides with a direction in which the vehicle goes straight ahead before entering a curve. In FIGS. 22, 23, and 24, a straight line corresponding to a straight line 2006 is defined as H, and a straight line corresponding to the straight line 2007 is defined as V. As shown in FIG. 22, a wide-range area illuminated by the headlight device is defined as a main light distribution area 2002. A left end portion of a road and a right end portion thereof are defined as end portions 2001. For example, the end portions 2001 may indicate side strips drawn on the road. The horizon 2006 is a line which separates the ground and the sky. A center portion 2003 of the light distribution area shown in FIG. 22 is a portion whose illuminance is higher than a predetermined value in the main light distribution area 2002. The area having such a high illuminance is defined as a high illuminance area 2003. Note that each of the main light distribution area 2002 and the high illuminance area 2003 may have an illuminance distribution that has higher illuminance as coming close to a center portion of the area.

In a conventional technology, forming of the high illuminance area 2003 by a vehicle headlight device is realized by employing innovated shapes of lenses configuring the headlight device, using a plurality of lamps, or the like. Embodiments of the present invention will be explained about a vehicle headlight device in which the main light distribution area 2002 and high illuminance area 2003 are formed by a plurality of lamps.

As shown in FIG. 22, when the vehicle goes straight ahead, since an area where the line of sight of a driver directs coincides with a front side of the vehicle, the front side of vehicle is illuminated by a ray in the high illuminance area 2003. In FIG. 22, the lower side relative to the intersection of the horizon 2006 and the straight line 2007 perpendicular to the ground is illuminated by the ray in high illuminance area 2003.

On the other hand, as shown in FIG. 23, when the vehicle goes through a curve where the traveling direction thereof directs to the left, the vehicle tilts to the left and thus the main light distribution area 2002 tilts so that the right side thereof goes up and the left side thereof goes down. "Tilt" means slant. At that time, as shown in FIG. 23, the line of sight of driver directs an area ahead of the curve, and the area is defined as a driver's line-of-sight area at turning 2005. In FIG. 23, the driver's line-of-sight area at turning 2005 is indicated by the broken line.

Here, when the vehicle goes through a curve, the driver's line-of-sight area at turning 2005 is an area where the ray is not distributed. Thus, visibility of the area where the line of sight of driver is directed is decreased compared to the case when the vehicle goes straight ahead.

FIG. 24 is a diagram showing an illuminance distribution when the main light distribution area 2002 shown in FIG. 23 is rotated clockwise, as shown in Patent Document 1. By rotating clockwise the main light distribution area 2002, even when the vehicle goes through a left-hand curve, the ray is distributed so that the main light distribution area 2002 includes the driver's line-of-sight area at turning 2005. In this case, it is possible to illuminate the driver's line-of-sight area at turning 2005. However, the area where the line of sight of driver is directed (driver's line-of-sight area at turning 2005) cannot be illuminated by the ray in high illuminance area 2003, while it can be done when the vehicle goes straight ahead. Therefore, visibility is decreased compared to the case when the vehicle goes straight ahead.

Embodiment 1

Figure 1:
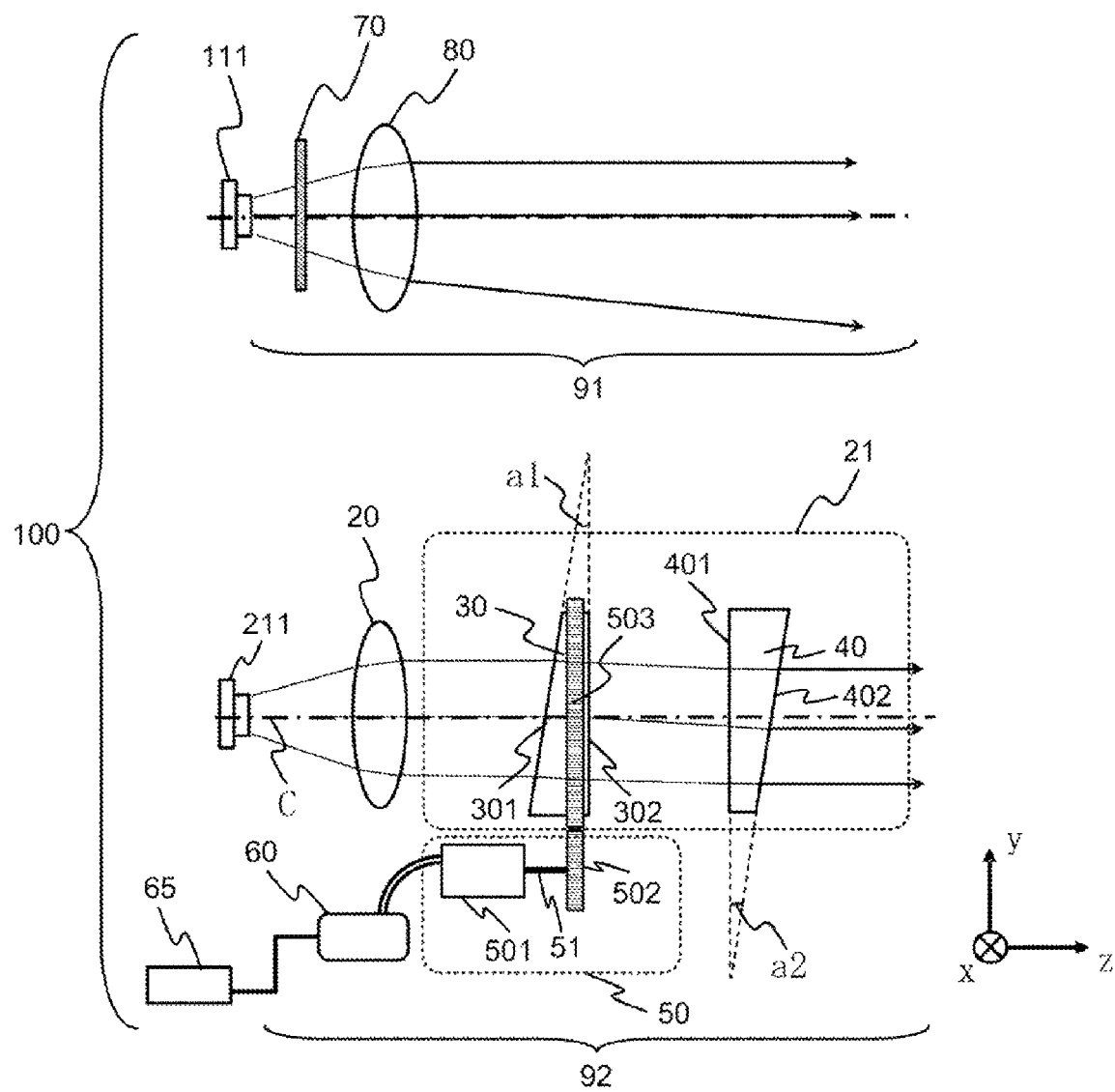
FIG. 1 is a diagram schematically showing a configuration of a headlight device according to Embodiment 1 of the present invention.

FIG. 1 is a diagram showing a vehicle headlight device 100 in Embodiment 1 of the present invention. In order to facilitate the explanation, the x-y-z coordinate is used in the following figures. The x-axis coincides with the right and left direction with respect to the vehicle traveling direction. The left side of vehicle traveling direction is the +x-axis direction, and the right side thereof is the −x-axis direction. The y-axis coincides with the up and down direction of vehicle. Thus, when the vehicle tilts, the y-axis also tilts. The upper side is the +y-axis direction and the lower side is the −y-axis direction. Here, "upper side" means a direction of the sky and "lower side" means a direction of the ground. The z-axis coincides with the front and rear direction of vehicle. The front direction is the +z-axis direction and the rear direction is the −z-axis direction.

In FIG. 1, the vehicle headlight device 100 includes two lamps, i.e. a lamp 91 (second lamp) and a lamp 92 (first lamp) for respectively illuminating the main light distribution area 2002 and the high illuminance area 2003 in the light distribution area shown in FIG. 22. The lamp 91 and lamp 92 are adjacently disposed in the vehicle headlight device 100. Compared to the lamp 91, the lamp 92 projects a ray having higher illuminance and for illuminating a narrower area. Compared to the lamp 92, the lamp 91 projects a ray having lower illuminance and for illuminating a wider area.

The lamp 91 has a light source 111 and an optical element 80. The lamp 91 may have a douser 70. The douser 70 shapes light projected from the light source 111 into a desired form. The douser 70 has an opening so as to obtain a light distribution not dazzling oncoming drivers. The ray having passed through the douser 70 is projected to a desired position by the optical element 80 so that the distribution thereof is adjusted.

A planar light source may be employed as the light source 111 so that the ray from light source 111 is transmitted to the optical element 80 with a reduced loss. For example, LEDs, electroluminescence devices, semiconductor lasers, or the like are employed as the planar light source. A projection lens, a reflector, or the like is employed as the optical element 80 for projecting the ray from light source 111 on the road surface. FIG. 1 shows a case where a lens is employed as the optical element 80.

The lamp 92 (first lamp) has a light source 211, an optical system 21, a rolling mechanism 50, and a control circuit 60. The lamp 92 may also have an optical element 20. The ray projected from the light source 211 is collimated by the optical element 20. The ray collimated by the optical element 20 is deflected toward a desired position by the optical system 21. "Deflection" means to bend or change a traveling direction of a ray. The rolling mechanism 50 drives the optical system 21. As the optical system 21 is driven by the rolling mechanism 50, a deflection direction of the ray projected from the light source 211 changes. The control circuit 60 controls the rolling mechanism.

A planar light source may be employed as the light source 211 so that the ray from light source 211 is transmitted to the optical element 20 with a reduced loss. For example, LEDs, electroluminescence devices, semiconductor lasers, or the like are employed as the planar light source. A collimating lens having a positive power, a reflector, or the like is employed as the optical element 20. FIG. 1 shows a case where a lens is employed as the optical element 20.

The optical system 21 has a wedge prism 30 and a wedge prism 40. Driving force is transmitted to the optical system 21 by a gear 503. "Wedge prism" means a prism having a small apex angle. "Apex angle" means an angle between two refractive surfaces of a prism. That is, a wedge prism has tilted optical surfaces, and one surface usually tilts against the other surface by a very small angle. Incident light is refracted toward a direction in which a prism has a larger thickness. In the following explanation, the apex angle is called as a wedge angle a. While flat surfaces are usually employed as two refractive surfaces of a prism, "wedge prism" shown below includes a case where a curved surface is employed as the refractive surface. The wedge prism is used so that one of the refractive surfaces is disposed so as to be perpendicular to an optical axis. The wedge prism is used so that it rotates about the optical axis or an axis parallel thereto, serving as a rotating axis. When a curved surface is employed as the refractive surface, "surface perpendicular to optical axis" means that a tangential plane at a point where the rotating axis intersects with the refractive surface is perpendicular to the optical axis.

The wedge prism 30 has an incident surface 301 and an emission surface 302. The incident surface 301 is a surface tilted by a wedge angle a1 with respect to a surface perpendicular to an optical axis C. The emission surface 302 is a surface perpendicular to the optical axis C. The wedge prism 40 has an incident surface 401 and an emission surface 402. A ray projected from the emission surface 302 of wedge prism 30 enters the incident surface 401. The incident surface 401 is a surface perpendicular to the optical axis C. The emission surface 402 is a surface tilted by a wedge angle a2 with respect to the surface perpendicular to optical axis C. Here, a case is shown where the wedge angle a1 equals to the wedge angle a2. When the wedge angle a1 differs from the wedge angle a2, calculation may be performed in a formula described later by substituting each value of wedge angle a1 and wedge angle a2 thereinto. The optical axis C is a normal line at an emission surface center of the light source 211.

The wedge angle a1 of wedge prism 30 equals to the wedge angle a2 of wedge prism 40. The incident surface 301 of wedge prism 30 is parallel to the emission surface 402 of wedge prism 40. The wedge angle a1 of wedge prism 30 is disposed so as to direct in the −y-axis direction. Since the −y-axis direction is a road surface direction, the wedge angle a1 is disposed so as to direct the road surface. That is, the incident surface 301 is a surface in which the surface perpendicular to optical axis C is rotated clockwise by the wedge angle a1 when viewed from the −x-axis direction. The wedge angle a2 of wedge prism 40 is disposed so as to direct in the +y-axis direction. That is, the emission surface 402 is a surface in which the surface perpendicular to optical axis C is rotated clockwise by the wedge angle a2 when viewed from the −x-axis direction. "Wedge angle directs road surface" means that a position where two refractive surfaces (incident surface and emission surface) intersect is located at the opposite side of road surface with respect to the optical axis C.

The wedge prism 30 is rotatably disposed about the optical axis C. The gear 503 to which a rotating motion from the rolling mechanism 50 is transmitted is provided in the wedge prism 30. Driving force from the rolling mechanism 50 is transmitted to the gear 503. As to a method for rotating the wedge prism 30 by the rolling mechanism 50, any method may be employed as long as the driving force from the rolling mechanism 50 can be transmitted to the wedge prism 30. Therefore, not limited to the gear 503, a belt etc. may be employed, for example.

Figure 2:
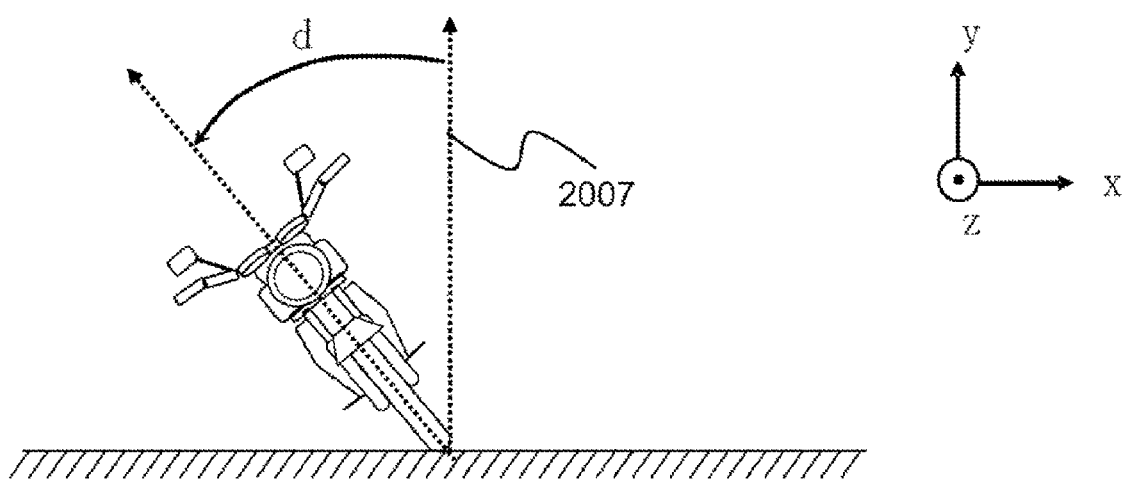
FIG. 2 is a diagram explaining a vehicle bank angle d.

FIG. 2 is a diagram explaining a bank angle d when the vehicle goes through a curve. "Bank angle d" means a tilt angle d of the vehicle body with respect to the straight line 2007 perpendicular to the ground (y-axis), as shown in FIG. 2. As the curvature of a curve where the vehicle goes therethrough increases, the vehicle body bank angle d increases.

The rolling mechanism 50 shown in FIG. 1 has a drive source 501, a driving shaft 51, and a gear 502. A stepping motor, for example, may be employed as the drive source 501. The driving shaft 51 is a shaft for transmitting the rotation of drive source 501 to the gear 502. The transmitted rotating motion of the driving shaft 51 drives the gear 502 and the gear 503 is driven thereby. The gear 502 engages with the gear 503.

The rolling mechanism 50 has a function of rotating the wedge prism 30 about the optical axis C in a direction opposite to the vehicle banked direction, in accordance with the vehicle body bank angle d shown in FIG. 2. "Bank" means that the vehicle body tilts when going through a curve, etc. "Banked direction" means a direction in which the vehicle body tilts in the right side (−x-axis direction) or in the left side (+x-axis direction). It may be also called as "bank direction" hereinafter. Note that the rolling mechanism 50 should not be limited to the above-described configuration, as long as the mechanism can rotate the wedge prism 30 about an axis parallel to the optical axis C.

The control circuit 60 receives a detected signal from a vehicle body tilt detector 65 for detecting the vehicle body bank angle d. For example, a sensor such as a gyro is employed as the vehicle body tilt detector 65. The control circuit 60 calculates a rotation angle f of the wedge prism 30 based on the detected signal and controls the drive source 501. The rotation angle f is a rotation angle of the wedge prism 30 necessary for the lamp 92 to illuminate the driver's line-of-sight area at turning 2005 (see FIG. 22).

In order to calculate the rotation angle f necessary for the wedge prism 30 at the bank angle d, how a ray parallel to the optical axis C is deflected by a pair of wedge prisms will be explained hereinafter.

Figure 3:
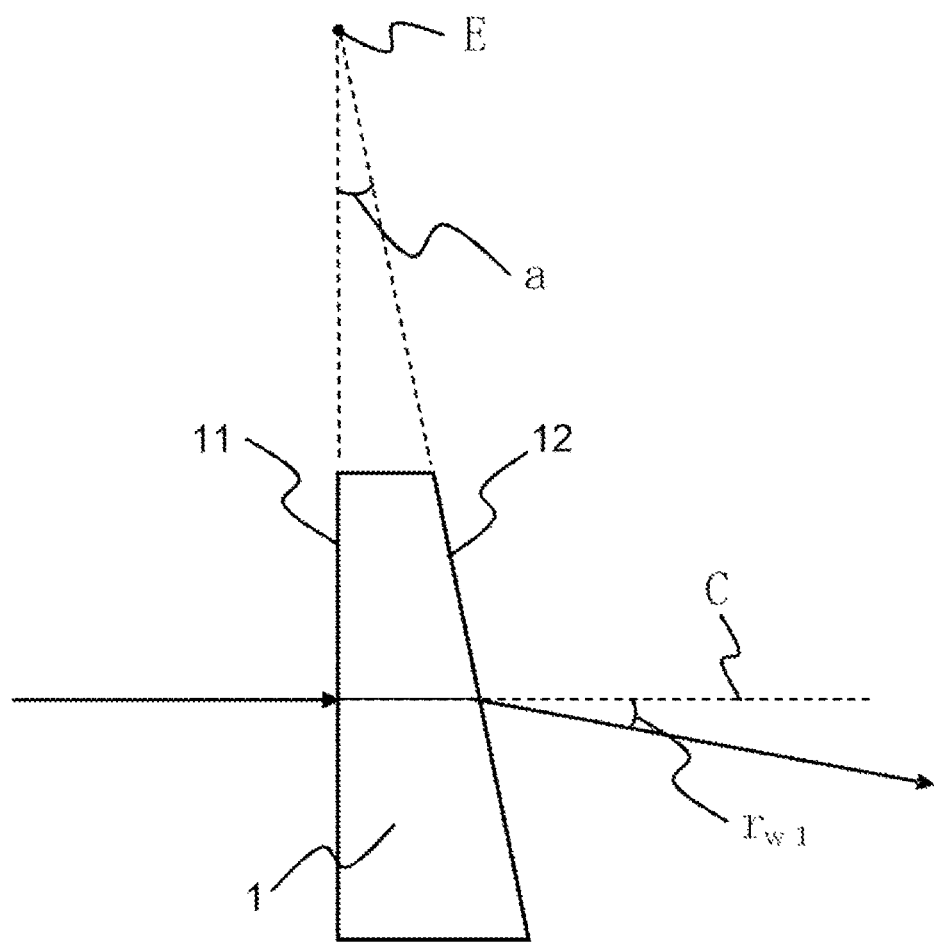
FIG. 3 is a diagram explaining a wedge prism of the headlight device according to Embodiment 1 of the present invention.

FIG. 3 is a diagram explaining a wedge prism of the vehicle headlight device 100. FIG. 3 shows a ray deflected by a wedge prism 1 having a wedge angle a. A collimated ray parallel to the optical axis C enters an incident surface 11, perpendicular to the optical axis C, of the wedge prism 1. An emission surface 12 tilts by the wedge angle a with respect to the incident surface 11. The incident ray travels the inside of wedge prism 1 without being refracted by the incident surface 11. When projected from the emission surface 12, the incident ray travels being refracted to the direction opposite a position E where the incident surface 11 intersects with the emission surface 12.

When the collimated ray parallel to the optical axis C enters the incident surface 11, perpendicular to the optical axis C, of the wedge prism 1, it is known that a deflection angle $r_{w1}$ of the ray can be approximately calculated by the following formula (1) using a refractive index $n_w$ of the wedge prism 1. The formula (1) is an approximation when the wedge angle a is small. "Deflection angle" means a bent angle of the incident ray.

[Math. 1]

$$r_{w1}(n_w-1)a \qquad (1)$$

Figure 4:
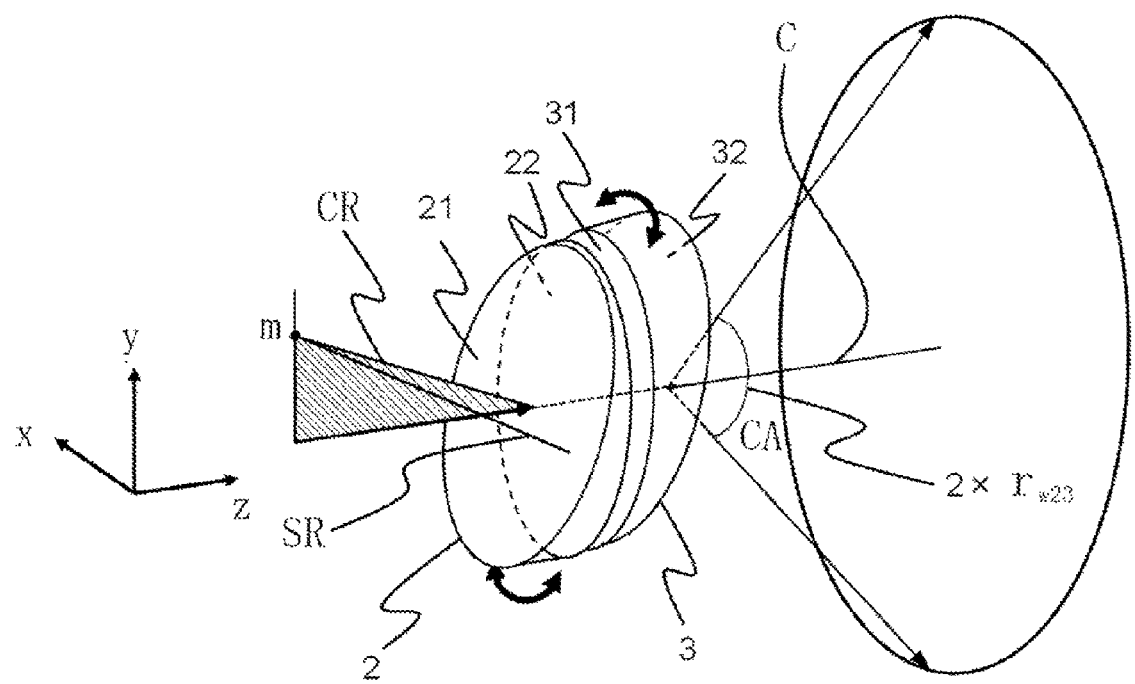
FIG. 4 is a diagram explaining another wedge prism of the headlight device according to Embodiment 1 of the present invention.

FIG. 4 is a diagram explaining wedge prisms 2, 3 of the vehicle headlight device 100. FIG. 4 shows a ray deflected by a pair of wedge prisms 2, 3. The pair of wedge prisms 2, 3 is disposed so that their surfaces perpendicular to the optical axis C face each other. The x-y-z coordinate is shown in FIG. 4. The z-axis indicates the vehicle traveling direction. The vehicle travels in the +z-axis direction. The x-axis coincides with the right and left direction of vehicle. The left side of vehicle traveling direction is the +x-axis direction. The y-axis coincides with the up and down direction of vehicle. The upper side of vehicle (direction of sky) is the +y-axis direction. The x-axis and y-axis rotate about the z-axis in the vehicle tilting direction when the vehicle goes through a curve and is tilted, as will be described later.

An incident surface 21 of the wedge prism 2 is tilted with respect to the optical axis C. An emission surface 22 of the wedge prism 2 is perpendicular to the optical axis C. An incident surface 31 of the wedge prism 3 is perpendicular to the optical axis C. An emission surface 32 of the wedge prism 3 is tilted with respect to the optical axis C. The emission surface 22 of wedge prism 2 is disposed so as to face the incident surface 31 of wedge prism 3.

A ray parallel to the optical axis C enters the wedge prism 2 through the incident surface 21 and is projected from the emission surface 22. The ray, projected from the emission surface 22, enters the wedge prism 3 through the incident surface 31 and is projected from the emission surface 32. FIG. 4 shows a deflected ray projected from the emission surface 32 when a ray on the optical axis C enters through the incident surface 21. As shown in FIG. 4, a maximum deflection angle $r_{w23}$ is expressed by the following formula (2) when the wedge prism 2 and wedge prism 3 are independently rotated about the optical axis C. In FIG. 4, the rotation directions of wedge prism 2 and wedge prism 3 are shown by thick arrows.

[Math. 2]

$$r_{w23}=2(n-1)a \qquad (2)$$

The maximum deflection angle $r_{w23}$ is twice as much as the deflection angle $r_{w1}$ calculated by the formula (1). Therefore, the wedge prism 2 and wedge prism 3 can deflect a ray in an arbitrary position in a circular cone having a conical angle $CA=2\times r_{23}$, as shown in FIG. 4.

Figure 5:
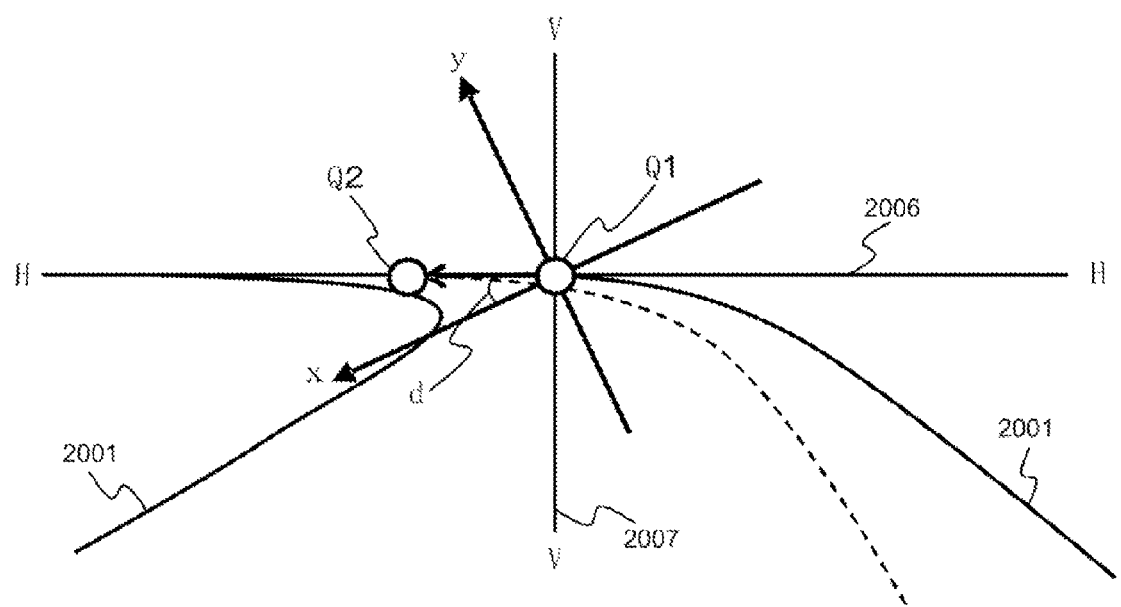
FIG. 5 is a diagram explaining a shift of a high illuminance area 2003 of the headlight device according to Embodiment 1 of the present invention.

FIG. 5 is a diagram explaining a shift of the high illuminance area 2003 illuminated by the vehicle headlight device 100. FIG. 5 is a diagram of looking a traveling direction from a running vehicle. FIG. 5 shows an example in which the vehicle goes through a left-hand curve. A position Q1 is an intersection between the horizon 2006 and the straight line 2007 that passes the vehicle body and that is perpendicular to the horizon 2006. That is, the position Q1 is a position where the line of sight of driver is directed when the vehicle goes straight ahead. A position Q2 is a position where the line of sight of driver is directed when the vehicle goes through a left-hand curve with a bank angle d. In FIG. 5, the position Q1 and position Q2 are shown by white circles.

In FIG. 5, a coordinate system when viewed from the vehicle tilted by the bank angle d is indicated by the x-y coordinate. The x-axis passes the position Q1 and tilts by the bank angle d with respect to the horizontal straight line 2006. In FIG. 5, the x-axis tilts in the counterclockwise direction with respect to the horizontal straight line 2006. The y-axis passes the position Q1 and tilts by the bank angle d with respect to the vertical straight line 2007. In FIG. 5, the y-axis tilts in the counterclockwise direction with respect to the vertical straight line 2007. In FIG. 5, a straight line corresponding to the straight line 2006 is defined as H, and a straight line corresponding to the straight line 2007 is defined as V. The same will apply to Hs and Vs in the following figures.

When the vehicle goes straight ahead, the position Q1 where the line of sight of driver is directed is illuminated by the ray in high illuminance area 2003. As shown in FIG. 22, when the vehicle goes straight ahead, the high illuminance area 2003 is positioned at the position Q1 shown in FIG. 5. Similarly, when the vehicle goes through a curve, the position Q2 where the line of sight of driver is directed is illuminated by the ray in high illuminance area 2003. That is, the high illuminance area 2003 shifts from the position Q1 to the position Q2. At that time, the high illuminance area 2003 is needed to be shifted in a direction of angle d with respect to the x-axis of x-y coordinate when viewed from the vehicle. It means a direction of rotating clockwise by the angle d with respect to the x-axis in FIG. 5. The same will apply when the vehicle goes through a right-hand curve. That is, the high illuminance area 2003 shifts within the first quadrant and second quadrant of the x-y coordinate of vehicle. Thus, a range illuminated by the ray in high illuminance area 2003 is the upper half area of deflection area shown in FIG. 4. The deflection area is expressed by the base of circular cone having a solid angle of $2\times r_{w23}$. Here, "upper" means the y-axis direction shown in FIG. 4.

Figure 6:
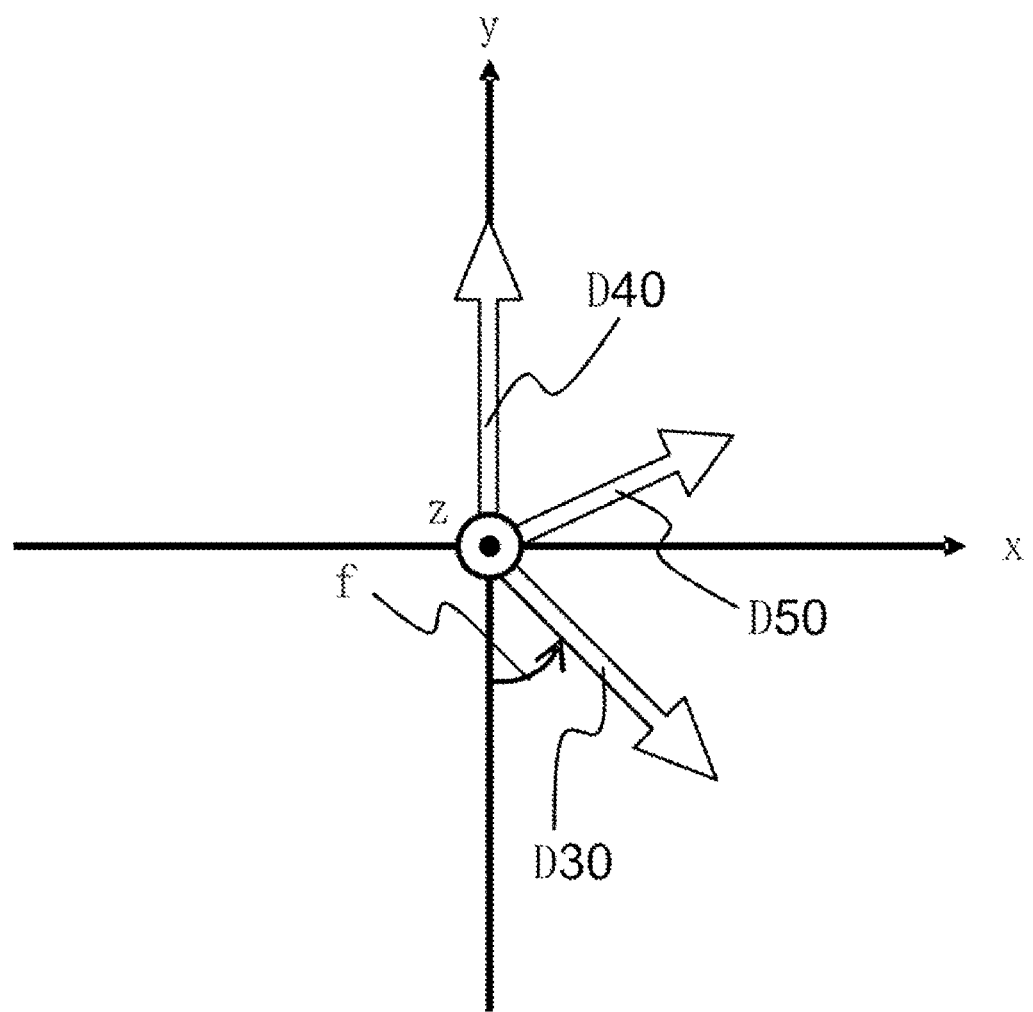
FIG. 6 is a diagram explaining deflection by the headlight device according to Embodiment 1 of the present invention.

FIG. 6 is a diagram explaining deflection by the optical system 21 included in the vehicle headlight device 100. FIG. 6 is a diagram of looking the vehicle from its front side. That is, it is a diagram of looking from the +z-axis direction toward the −z-axis direction. In the explanation using FIG. 6, the wedge prism 30 of optical system 21 shown in FIG. 1 is rotated clockwise by the rotation angle f when viewed from the −z-axis direction toward the +z-axis direction. In FIG. 6, the wedge prism 30 is rotated counterclockwise by the rotation angle f. On the other hand, as shown in FIG. 4, the wedge prism 40 is fixed so that its wedge angle a directs the +y-axis direction (direction opposite to the ground). That is, the emission surface 402 tilts with respect to the incident surface 401 so as to be broadened in the +y-axis direction.

A vector D30 is a deflection vector of the wedge prism 30. The vector D30 is a deflection vector when the wedge prism 30 is rotated by the rotation angle f. The vector D30 has a direction when rotated counterclockwise from the −y-axis direction by the rotation angle f about the intersection between the x-axis and y-axis. A vector D40 is a deflection vector of the wedge prism 40. The vector D40 is a deflection vector in the +y-axis direction by the wedge prism 40.

FIG. 6 shows a ray that enters the optical system 21 and that is deflected by the wedge prisms 30, 40 configuring the optical system 21 according to Embodiment 1. The ray entering the wedge prism 30 is deflected in a direction of resultant deflection vector D50 acquired by composing the deflection vector D30 and deflection vector D40. That is, by fixing the orientation of wedge prism 40, a deflection direction of ray entering the prism portion (wedge prisms 30, 40) can be easily changed.

In the vehicle headlight device 100 shown in Embodiment 1, the wedge prism 40 is fixed so that the ray is deflected in the +y-axis direction. In the vehicle headlight device 100, the wedge prism 30 is rotated about the optical axis C in accordance with the vehicle bank angle d. Thus, the high illuminance area 2003 of vehicle headlight device 100 can be shifted to an arbitrary position. That is, in the vehicle headlight device 100 shown in Embodiment 1, the high illuminance area 2003 can be shifted to an arbitrary position in accordance with an arbitrary vehicle bank angle d by using the above.

However, since a skew ray enters the wedge prism 40, it is not easy to obtain an illumination position of the high illuminance area 2003 when the wedge prism 30 is rotated. "Skew ray" means a ray not contained in a flat plane that includes both the optical axis and an object point. Here, the case in FIG. 4 will be explained as an example. In FIG. 4, an object point m is disposed at a position not on the optical axis C of wedge prism 2 in its −z-axis direction. A main ray CR is a ray passing the object point m and the intersection between the incident surface 21 and the optical axis C. Thus, a flat plane including both the object point m and the optical axis C described above is a flat plane including the main ray CR and the optical axis C (shown by shaded area). The skew ray SR is a ray not included in the flat plane. While there may be a simplified method of obtaining it by using the formula (1), there is a hypothesis that the wedge angle a is small in the formula (1). The method is not suitable for the lamp 92 which is required to correctly illuminate a desired position in accordance with the bank angle d.

Thus, a method will be presented in which an illumination position of the high illuminance area 2003 when the vehicle goes through a curve is correctly shifted to the driver's line-of-sight area at turning 2005 by using a ray refraction formula of expanding the Snell's law into three dimensions.

Figure 7:
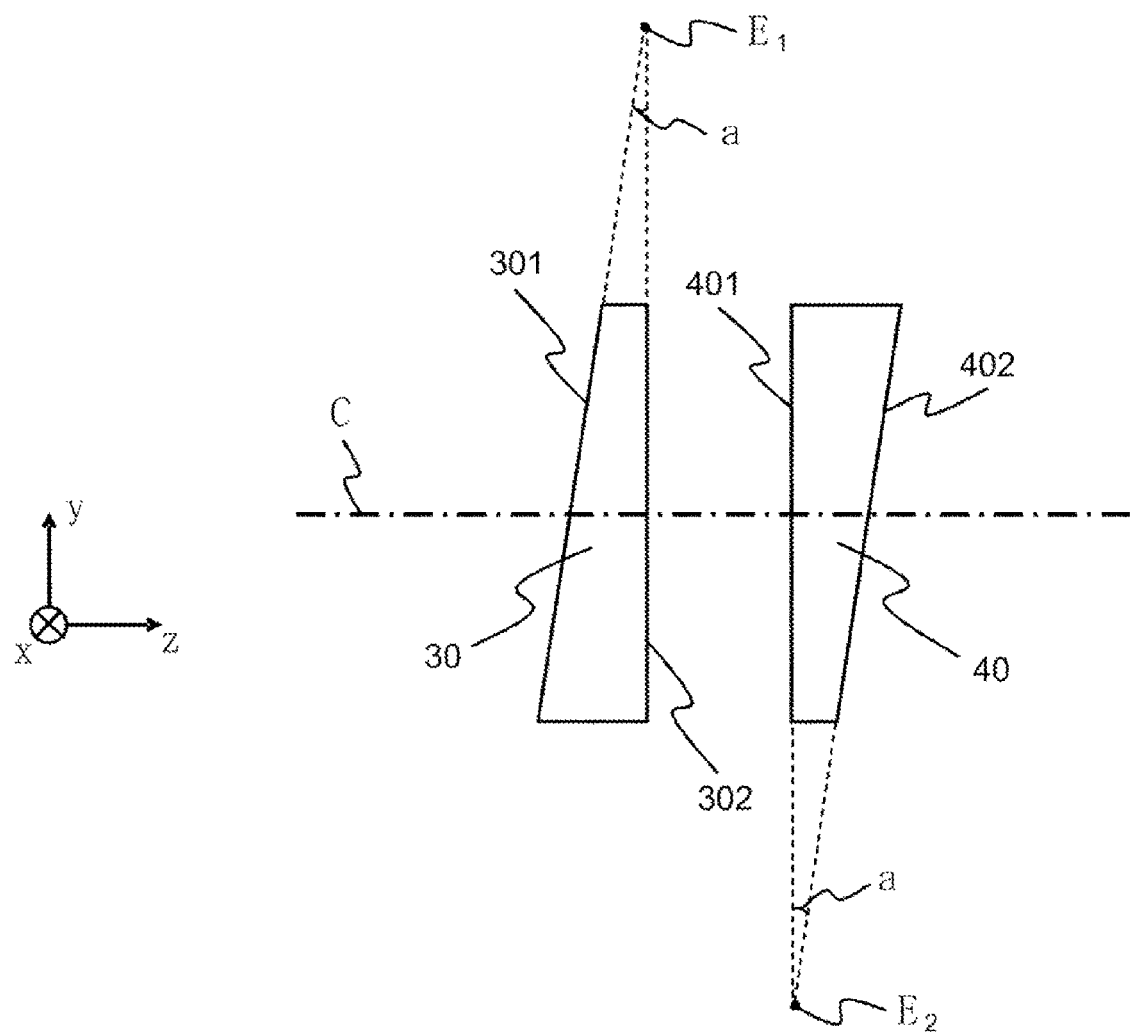
FIG. 7 is a diagram explaining a configuration of another wedge prism of the headlight device according to Embodiment 1 of the present invention.

FIG. 7 is a diagram explaining a configuration of the wedge prism 30 and wedge prism 40 of the vehicle headlight device 100. FIG. 7 is a diagram when viewed from the −x-axis direction. FIG. 7 shows a disposition of the wedge prisms 30, 40 of lamp 92 when the vehicle runs a straight road. In FIG. 7, a position $E_1$ where the incident surface 301 intersects with the emission surface 302 in wedge prism 30 is located in the +y-axis direction with respect to the optical axis C. A position $E_2$ where the incident surface 401 intersects with the emission surface 402 in wedge prism 40 is located in the −y-axis direction with respect to the optical axis C. The emission surface 302 and incident surface 401 are surfaces perpendicular to the optical axis C. The wedge prisms 30, 40 are disposed so that the emission surface 302 faces the incident surface 401. A ray enters the wedge prism 30 through the incident surface 301 and is projected from the emission surface 302. The ray projected from the emission surface 302 enters the wedge prism 40 through the incident surface 401 and is projected from the emission surface 402.

A state shown in FIG. 7 is assumed to be a reference state. Here, a gap between the emission surface 302 of wedge prism 30 and the incident surface 401 of wedge prism 40 does not affect the deflection of a ray and can be ignored. "Gap" means a clearance. Thus, a pair of wedge prisms 30, 40 in FIG. 7 can be considered as an integrated prism 34 shown in FIG. 8. "Integrated" means combination. That is, two wedge prisms 30, 40 can be expressed as the single prism 34. When the wedge prism 30 is rotated in the circumferential direction of z-axis, a shape may be employed in which the incident surface 301 of prism 34 in FIG. 8 is only rotated in the circumferential direction of z-axis.

Figure 8:
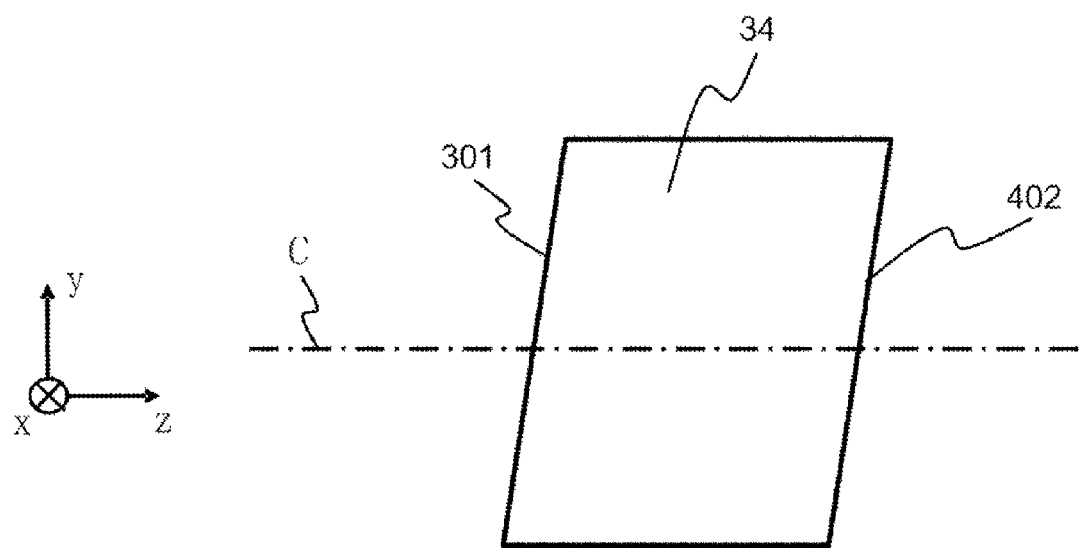
FIG. 8 is another diagram explaining the configuration of the wedge prism of the headlight device according to Embodiment 1 of the present invention.

FIG. 8 is a diagram explaining a configuration of the wedge prisms 30, 40 of vehicle headlight device 100. The prism 34 is a prism in which the wedge prisms 30, 40 are integrated. The prism 34 has the incident surface 301 and emission surface 402. The incident surface 301 and emission surface 402 are tilted by the wedge angle a with respect to a surface perpendicular to the optical axis C. The incident surface 301 and emission surface 402 are surfaces rotated clockwise by the wedge angle a with respect to the surface perpendicular to the optical axis C when viewed from the −x-axis direction. Thus, the incident surface 301 is a surface parallel to the emission surface 402.

A ray refraction formula is applied to a case where a ray that is projected from the light source 211 and that is collimated by the optical element 20 enters the prism 34 in FIG. 8. The center position of high illuminance area 2003 at an arbitrary distance from the emission surface 402 of prism 34 is calculated as follows.

Figure 9:
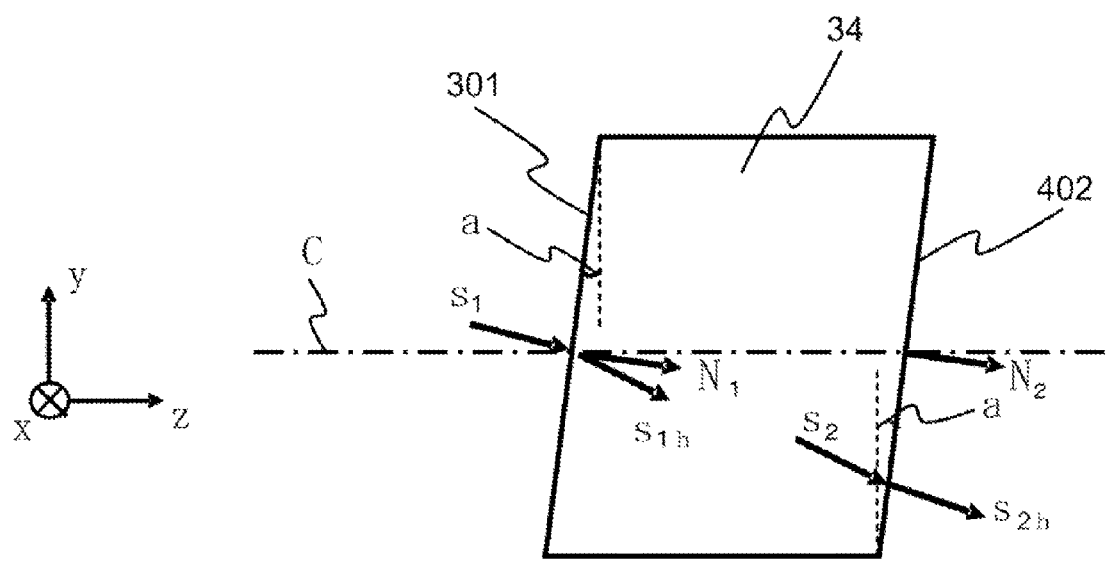
FIG. 9 is another diagram explaining the configuration of the wedge prism of the headlight device according to Embodiment 1 of the present invention.

FIG. 9 is a diagram explaining a configuration of the wedge prisms 30, 40 of vehicle headlight device 100. In FIG. 9, a method of calculating the center position of high illuminance area 2003 will be explained by using the prism 34 shown in FIG. 8.

As shown in FIG. 9, symbols are defined as follows. A unit direction vector (direction cosine) of an incident ray entering the prism 34 through the incident surface 301 is defined to be a vector $s_1$, a normal vector of the incident surface 301 to be a vector $N_1$, and a unit direction vector of a ray transmitting through the incident surface 301 to be a vector $s_{1h}$. A unit direction vector of a ray entering the emission surface 402 is defined to be a vector $s_2$, a normal vector of the emission surface 402 to be a vector $N_2$, and a unit direction vector of a projected ray (transmitting ray) from the emission surface 402 to be a vector $s_{2h}$. When the refractive indexes of air and a medium of prism 34 are respectively assumed to be 1 and n, relationships shown in the following formulas (3) and (4) can be established based on the ray refraction formula.

[Math. 3]

$$nN_1 \times s_1 = N_1 \times s_{1h} \qquad (3)$$

[Math. 4]

$$N_2 \times s_{2h} = nN_2 \times s_2 \qquad (4)$$

The formulas (3) and (4) can be expressed as the following varied formulas (3a) and (4a) if the vector rules are applied.

[Math. 5]

$$n\{(N_1 \cdot s_{1h})N_1 - s_1\} = \{(N_1 \cdot s_1)N_1 - s_1\} \quad (3a)$$

[Math. 6]

$$\{(N_2 \cdot s_{2h})N_2 - s_{2h}\} = n\{(N_2 \cdot s_2)N_2 - s_2\} \quad (4a)$$

If inner products $g_1$ and $g_{1h}$ are defined by the following formulas, the formula (3a) can be expressed by the formula (3b).

[Math. 7]

$$g_1 = N_1 \cdot s_1$$

[Math. 8]

$$g_{1h} = N_1 \cdot s_{1h} = 1/n \times (n_2 - 1 + g_1^2)^{1/2}$$

[Math. 9]

$$s_{1h} = g_{1h}N_1 - 1/n \times (g_1 N_1 - s_1) \quad (3b)$$

Inner products $g_2$ and $g_{2h}$ are defined by the following formulas and it is assumed that $s_2 = s_{1h}$. Then, the formula (4a) can be expressed by the following varied formula (4b).

[Math. 10]

$$g_2 = N_2 \cdot s_{1h}$$

[Math. 11]

$$g_{2h} = N_2 \cdot s_{2h} = (1 - n^2 + n^2 g_2^2)^{1/2}$$

[Math. 12]

$$s_{2h} = g_{2h}N_2 - n(g_2 N_2 - s_{1h}) \quad (4b)$$

Thus, the unit direction vector $s_{2h}$ of projected ray from the emission surface 402 can be expressed by the following formula (5) by using the formulas (3b) and (4b). The unit direction vector $s_{2h}$ can be calculated uniquely by using the formula (5).

[Math. 13]

$$s_{2h} = (g_{2h} - ng_2)N_2 + (ng_{1h} - g_1)N_1 + s_1 \quad (5)$$

Since the wedge prism 30 is rotated in the present invention, the normal vector $N_1$ in formula (5) varies depending on its rotation angle f. If the rotation angle of wedge prism 30 is assumed to be an angle f, a wedge angle thereof to be an angle a, and the normal vector of incident surface 301 when the vehicle runs a straight road to be a vector $N_{10}$, the normal vector $N_1$ can be calculated by the following formula (6) by using a rotation matrix $R_f$.

[Math. 14]

$$N_1 = R_f N_{10} = \begin{pmatrix} \cos f & -\sin f & 0 \\ \sin f & \cos f & 0 \\ 0 & 0 & 1 \end{pmatrix} \begin{pmatrix} 0 \\ -\sin a \\ \cos a \end{pmatrix} = \begin{pmatrix} \sin f \cdot \sin a \\ -\cos f \cdot \sin a \\ \cos a \end{pmatrix} \quad (6)$$

Considering that a main ray that is projected from the light source 211 and that is parallel to the optical axis C enters, the unit direction vector $s_1$ in formula (5) can be expressed by the following formula (7). "Main ray" means a ray that obliquely enters a lens from a point not on the optical axis and that passes an aperture center of the optical system. It is a ray that exists even if the minimum aperture is employed. Here, it indicates a ray that obliquely enters a lens from a point not on the optical axis and that passes a position where the incident surface 301 intersects with the optical axis C.

[Math. 15]

$$S_1 = \begin{pmatrix} 0 \\ 0 \\ 1 \end{pmatrix} \quad (7)$$

The normal vector $N_2$ of emission surface 402 can be expressed by the following formula (8).

[Math. 16]

$$N_2 = \begin{pmatrix} 0 \\ \sin a \\ \cos a \end{pmatrix} \quad (8)$$

Figure 10:
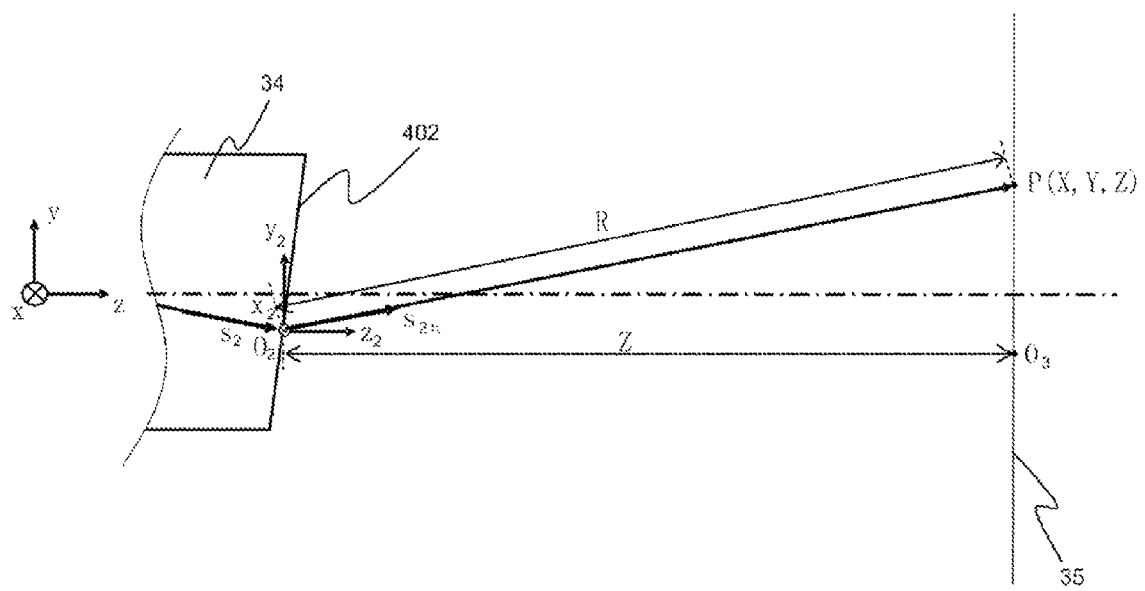
FIG. 10 is a diagram explaining an illumination position of a ray from the headlight device according to Embodiment 1 of the present invention.

FIG. 10 is a diagram explaining an illumination position of a ray from the vehicle headlight device 100. FIG. 10 shows a geometric relationship between the emission surface 402 of prism 34 and a screen surface 35. A new coordinate system $x_2$-$y_2$-$z_2$ is set by taking its origin at an emission point $O_2$ of a ray from the emission surface 402. The $x_2$-axis is parallel to the x-axis. The +$x_2$-axis direction coincides with the +x-axis direction. The $y_2$-axis is parallel to the y-axis. The +$y_2$-axis direction coincides with the +y-axis direction. The $z_2$-axis is parallel to the z-axis. The +$z_2$-axis direction coincides with the +z-axis direction.

A ray illumination position P(X, Y, Z) on the screen surface 35, located at a position having a distance Z from the origin $O_2$ in the +$z_2$-axis direction, will be calculated. The screen surface 35 is a surface perpendicular to the optical axis C. A distance from the origin $O_2$ to the illumination position P(X, Y, Z) is defined to be a distance R. A straight line that connects between the origin $O_2$ and the illumination position P is parallel to the unit direction vector $s_{2h}$. Here, the screen surface 35 is a virtual plane for explaining an illumination position. Each of components in the unit direction vector $s_{2h}$ is defined by the following formula (9).

[Math. 17]

$$s_{2h} = \begin{pmatrix} s_{2xh} \\ s_{2yh} \\ s_{2zh} \end{pmatrix} \quad (9)$$

The distance R can be expressed by the following formula (10).

[Math. 18]

$$R = (X^2 + Y^2 + Z^2)^{1/2} \quad (10)$$

Components in the unit direction vector $s_{2h}$ can be expressed by the following formula (11).

[Math. 19]

$$\begin{pmatrix} s_{2xh} \\ s_{2yh} \\ s_{2zh} \end{pmatrix} = \begin{pmatrix} X/R \\ Y/R \\ Z/R \end{pmatrix} \quad (11)$$

Assuming that the distance Z is already known, a coordinate of the position P on the screen surface 35 illuminated by a ray projected from the origin $O_2$ can be calculated and expressed by the following formula (12).

[Math. 20]

$$\begin{cases} R = Z/s_{2zh} \\ X = Z \cdot s_{2xh} \\ Y = Z \cdot s_{2yh} \end{cases} \quad (12)$$

When the rotation angle f of wedge prism 30 is changed, a position of the emission point $O_2$ on the emission surface 402 of wedge prism 40 also varies. The emission point $O_2$ is the same with the above-described origin $O_2$. In the present invention, since a point having an enough distance is illuminated, the difference therebetween can be ignored. Thus, by using the formula (12), a position illuminated by a ray that reaches the screen surface 35 having an arbitrary distance can be correctly calculated.

Figure 11:
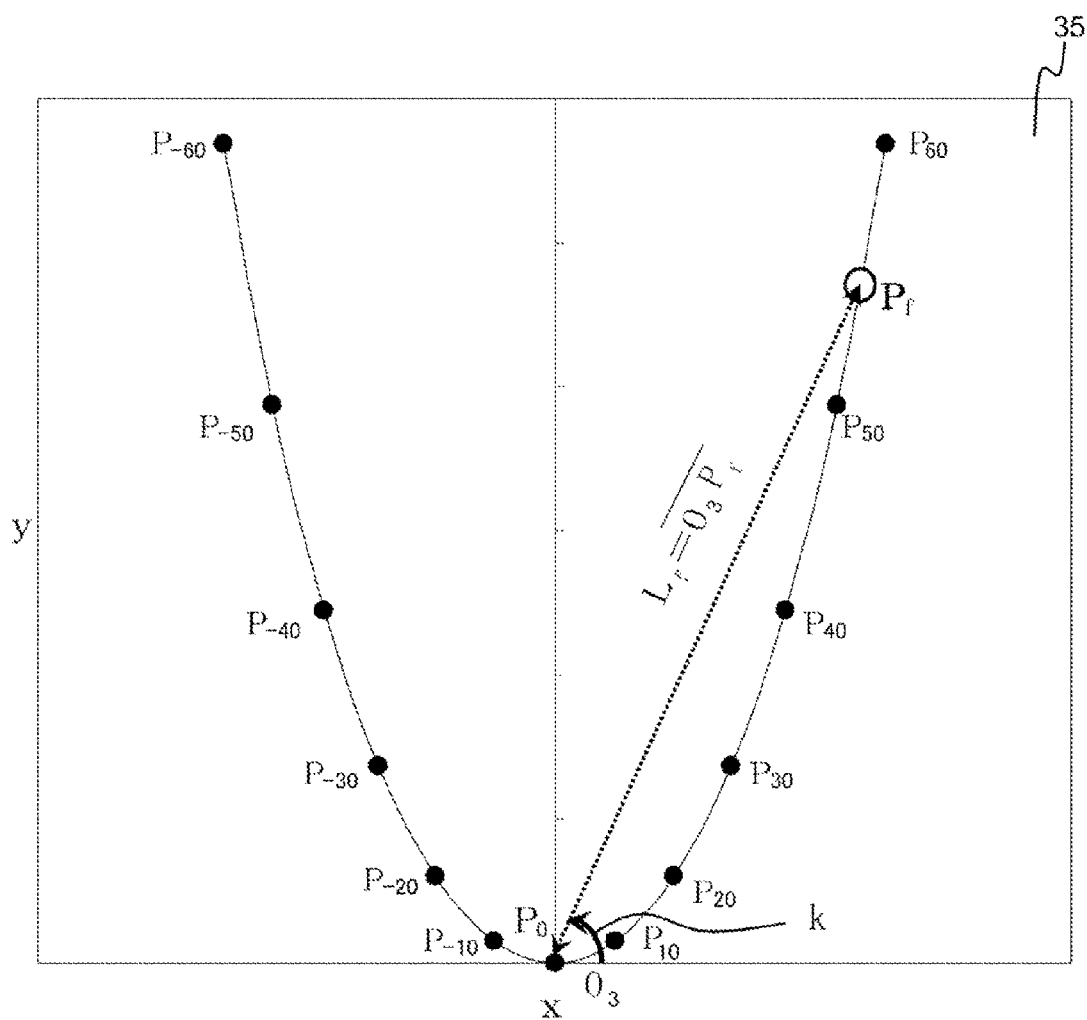
FIG. 11 is another diagram explaining the illumination position of the ray from the headlight device according to Embodiment 1 of the present invention.

FIG. 11 is a diagram explaining an illumination position of a ray from the vehicle headlight device 100. FIG. 11 shows, as an example, a case where coordinates of illumination positions $P_f(X, Y)$ on the screen surface 35 are plotted when the rotation angle f of wedge prism 30 is varied. On the x-axis in FIG. 11, x-coordinate values of the illumination positions $P_f(X, Y)$ are shown. On the y-axis in FIG. 11, y-coordinate values of the illumination positions $P_f(X, Y)$ are shown. The suffix of symbol P indicates each rotation angle f. The origin $O_3$ is a position on the screen surface 35 where the main ray projected from the center of light source 111 reaches when the wedge prism 30 is not rotated.

Now, the illumination positions $P_f$ will be focused on. Assuming that an angle between the x-axis and a straight line L shown in FIG. 11 is an angle k, the angle k can be expressed by the following formula (13). The straight line L is a straight line connecting between the origin $O_3$ and the illumination position $P_f$ on the screen surface 35. Hereinafter, the angle k will be referred to as a tilt angle of the illumination position $P_f$.

[Math. 21]

$$k = \tan^{-1}(Y/X) \quad (13)$$

A distance $L_f$ between the origin $O_3$ and the illumination position $P_f$ on the x-y plane can be expressed by the following formula (14).

[Math. 22]

$$L_f = (X^2 + Y^2)^{1/2} \quad (14)$$

Here, the distance $L_f$ can be expressed by the following formula (15).

[Math. 23]

$$L_f = \overline{O_3 P_f} \quad (15)$$

The trajectory shown by illumination positions $P_f$ depends on the wedge angle a and refractive index n of each of the wedge prism 30 and wedge prism 40. The illumination position $P_f$ is a position on the screen surface 35 illuminated by a ray when the wedge prism 30 is rotated by the rotation angle f, as shown in FIG. 11. Thus, by optimizing the wedge angle f and refractive index n, designing is possible so that a shift distance $L_f$ (distance $L_f$ shown in FIG. 11) coincides with a desired shift distance. Here, the shift distance $L_f$ is a horizontal shift distance of the high illuminance area 2003 at an arbitrary bank angle d. The reason is that, since the x-y coordinate tilts by an angle d when the vehicle body tilts by the angle d, the straight line L is a straight line extending in the horizontal direction.

Now, a case will be presented in which the vehicle goes through a curve with a bank angle d. The wedge prism 30 is rotated so that the tilt angle k, calculated by the formula (13), of the illumination position $P_f$ is in a direction opposite to the bank angle d and a value of the angle k is equal to that of the bank angle d. In this case, a ray projected from the lamp 92 shifts within the first quadrant and second quadrant of x-y-z coordinate system of vehicle. Thus, the vehicle headlight device 100 can effectively utilize the ray.

Figure 12:
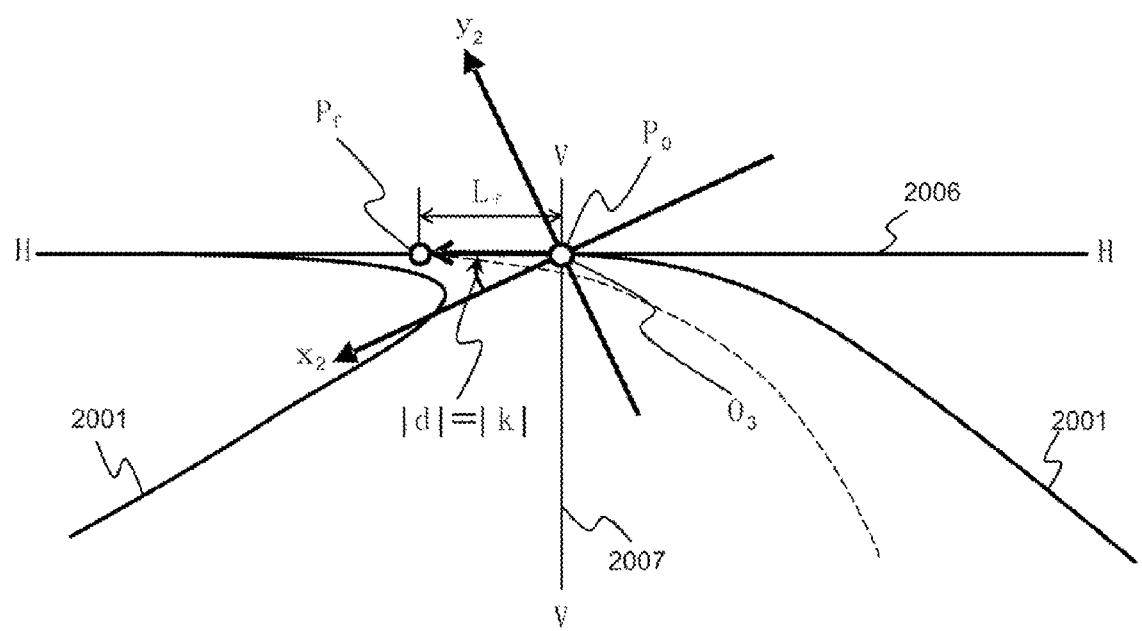
FIG. 12 is another diagram explaining the illumination position of the ray from the headlight device according to Embodiment 1 of the present invention.

As shown in FIG. 12, when the vehicle runs a straight road, the main ray projected from the lamp 92 reaches the origin $O_3$. On the other hand, when the vehicle goes through a curve, the wedge prism 30 is rotated in a direction opposite to the vehicle bank direction. Thus, the main ray projected from the lamp 92 shifts by the distance $L_f$ toward the inner side of curve in the horizontal direction. That is, the main ray projected from the lamp 92 shifts from the illumination position $P_0$ to the illumination position $P_f$. "Inner side of curve" means the left side when the road curves to the left and the right side when the road curves to the right.

Figure 13:
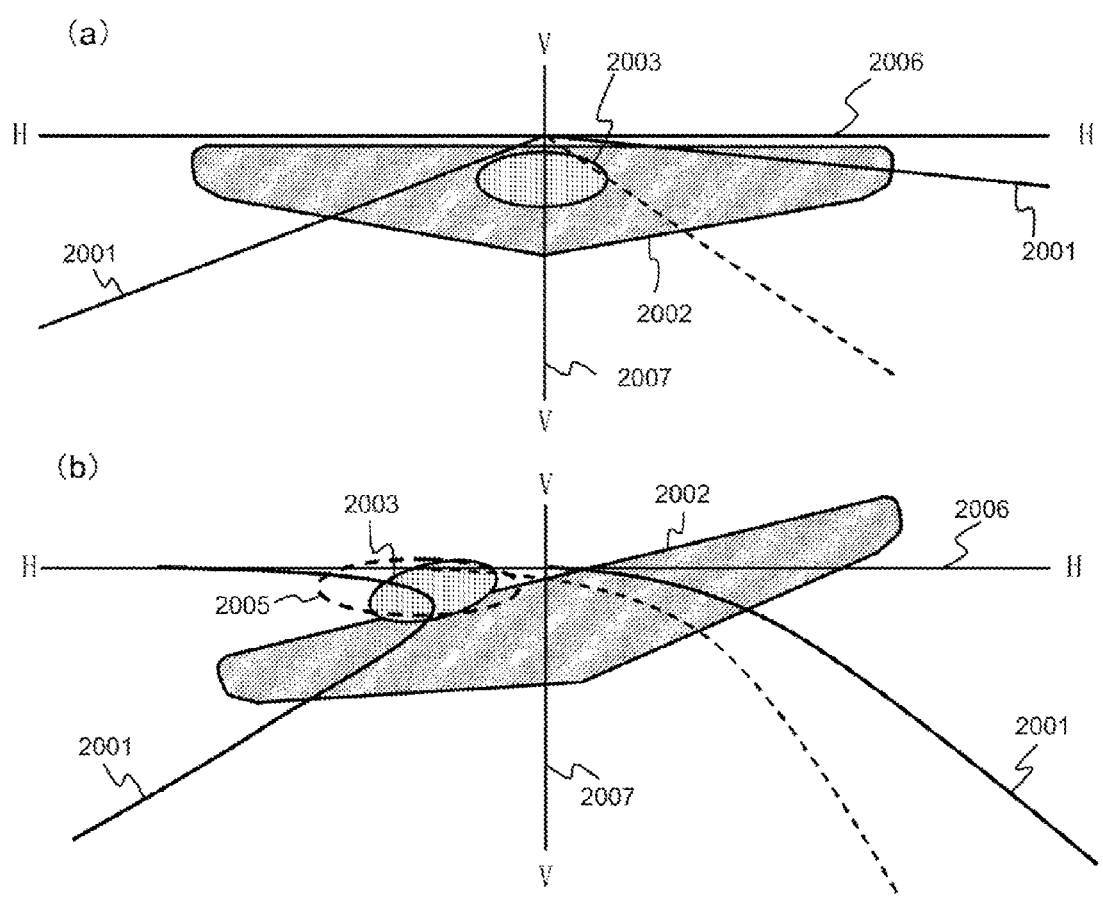
FIG. 13 is a diagram explaining a light distribution area of the headlight device according to Embodiment 1 of the present invention.

(a) in FIG. 13 is a diagram showing a light distribution of the main light distribution area 2002 and a light distribution of the high illuminance area 2003 in the present invention when the vehicle runs a straight road. (b) in FIG. 13 is a diagram showing a light distribution of the main light distribution area 2002 and a light distribution of the high illuminance area 2003 in the present invention when the vehicle goes through a left-hand curve. When the vehicle runs a straight road, the high illuminance area 2003 illuminates an area just below the intersection between the horizon 2006 and the straight line 2007 perpendicular to the ground. Here, "just below" means the –y-axis direction. Note that the y-axis shown here is a coordinate having no bank angle d, since it is a coordinate of the vehicle going straight ahead. That is, if the ground is assumed to be horizontal, the y-axis direction is the vertical direction. The straight line 2007 perpendicular to the ground is located at the vehicle position in the right and left direction. On the other hand, when the vehicle goes through a curve, the high illuminance area 2003 shifts to the neighborhood of driver's line-of-sight area at turning 2005. That is, the high illuminance area 2003 shifts to the left side, parallel to the horizon 2006, from a position where the vehicle goes straight ahead.

In the vehicle headlight device 100 according to Embodiment 1, the high illuminance area 2003 can be shifted to a desired position by rotating only the wedge prism 30 in accordance with the bank angle d. Therefore, the vehicle headlight device 100 giving small burden to the rolling mechanism 50 and being downsized can be obtained.

In the vehicle headlight device 100, both the lamp 91 and the lamp 92 can be used. The lamp 91 is used for the main light distribution area 2002 for illuminating the front side of vehicle. The lamp 92 includes means for shifting the high illuminance area 2003 in accordance with the bank angle d. Thus, when the vehicle goes straight ahead, the vehicle headlight device 100 can illuminate its traveling direction with the ray in high illuminance area 2003. When the vehicle goes through a curve, the vehicle headlight device 100 can illuminate the driver's line-of-sight area at turning 2005 that shifts in accordance with the bank angle d, with the ray in high illuminance area 2003 in a continuously following manner. Thus, visibility of the driver during driving is increased.

In Embodiment 1, the wedge prism 30 is rotated in accordance with the bank angle d so that |d|=|k| is established. Here, |d| is an absolute value of the bank angle d and |k| is an absolute value of the tilt angle of illumination position $P_f$. However, this is not a limitation and may be changed appropriately. That is, in consideration of a light distribution shape, a vehicle speed, and the like, it may be rotated so that |d|≤|k| is established. For example, when the vehicle speed is large, the rotation angle k of wedge prism is controlled to be larger than the vehicle bank angle d. Thus, an area having longer distance can be illuminated.

When the vehicle goes through a curve, the rotation direction of rotation amount f of wedge prism 30 according to the shift of high illuminance area 2003 is opposite to the detected vehicle bank direction. The rotation amount f of wedge prism 30 may be controlled so that an amount of the tilt angle k of illumination position $P_f$, obtained by using the formula (13), coincides with the bank angle d. However, judging from FIG. 11, there is a non-linear relationship between the rotation amount f of wedge prism 30 and the tilt angle k of illumination position $P_f$. There is also a non-linear relationship between the rotation amount f of wedge prism 30 and the distance $L_f$. Therefore, non-linear control should be applied to control the rolling mechanism 50.

Thus, a rotation amount $f_u$ per unit bank angle is set, and the rolling mechanism 50 is controlled. A maximum bank angle $d_{max}$ (e.g. $d_{max}$=30 degrees) is designated in advance. A rotation amount of the wedge prism 30 at the maximum bank angle $d_{max}$ is assumed to be a necessary rotation amount $f_{max}$. The rotation amount $f_u$ per unit bank angle can be expressed by the following formula (16). If a value obtained by multiplying the rotation amount $f_u$ per unit bank angle by the bank angle d of vehicle being tilted is used to control the rolling mechanism 50, linear control can be applied and the control can be simplified.

[Math. 24]

$$f_n = f_{max}/d_{max} \qquad (16)$$

When the rotation amount f of wedge prism 30 is controlled by the rotation amount $f_u$ per unit bank angle, a shift amount of its light distribution is small if the bank angle d is small.

That is, if the above-described method is employed, the light distribution of high illuminance area 2003 does not shift greatly when the bank angle d is small. Thus, the driver does not feel discomfort and the light distribution giving less discomfort to the driver and being desirable can be provided.

In the vehicle headlight device 100 according to Embodiment 1, the wedge prisms 30, 40 are disposed as shown in FIG. 7 at the reference state when the vehicle runs a straight road. However, a state in FIG. 14 in which the wedge prism 30 and wedge prism 40 are both rotated by 180 degrees about the z-axis may be employed as a reference state.

Figure 14:
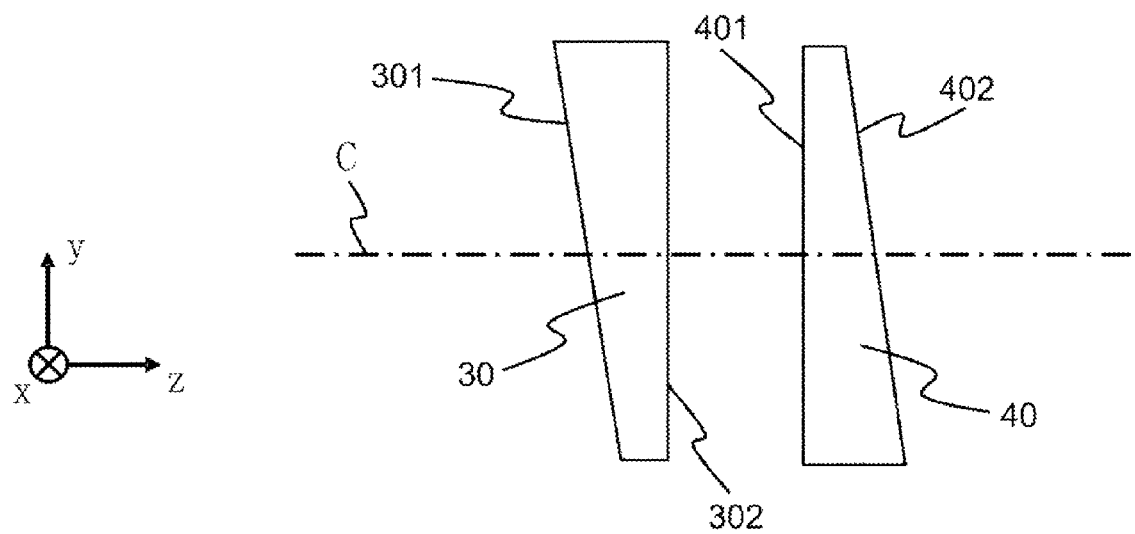
FIG. 14 is a diagram explaining a configuration of another wedge prism of the headlight device according to Embodiment 1 of the present invention.

FIG. 14 is a diagram explaining a configuration of the wedge prisms 30, 40 of vehicle headlight device 100. Note that the rolling mechanism 50 needs to drive the wedge prism 40 instead of the wedge prism 30 in this case. A method for controlling the rotation of wedge prism 40 in this case is the same as the method for controlling the rotation of wedge prism 30.

The vehicle headlight device 100 according to Embodiment 1 of the present invention includes the first lamp 92 that has the light source 211, optical system 21, rolling mechanism 50, and control circuit 60. The optical system 21 includes a first wedge prism 30 and a second wedge prism 40 in which an incident ray from the light source 211 is deflected and projected. The rolling mechanism 50 rotates the first wedge prism 30 about the rotation axis. The control circuit 60 controls the rolling mechanism 50 so that the first wedge prism 30 is rotated in a direction opposite to the vehicle bank direction in accordance with the vehicle bank angle d. The first wedge prism 30 and the second wedge prism 40 are disposed so that their surfaces perpendicular to the rotation axis face each other. The first wedge prism 30 is disposed so that the wedge angle a1 directs in the road surface direction. The first wedge prism 30 is disposed so as to be rotatable about the rotation axis. With the above-described configuration, the vehicle headlight device 100 can brightly illuminate the direction in which the line of sight of driver is directed when the vehicle goes through a curve. In addition, the vehicle headlight device 100 can continuously change its illumination area in accordance with the change in vehicle body bank angle. The ray enters the incident surface 301 of first wedge prism 30 and is projected from the emission surface 302. The ray projected from the emission surface 302 enters the incident surface 401 of second wedge prism 40 and is projected from the emission surface 402. Note that, in the explanation of Embodiment 1, the rotation axis is assumed to be parallel to the optical axis C, as an example.

The vehicle headlight device 100 according to Embodiment 1 of the present invention can further include the optical element 20 for collimating the ray projected from the light source 211. The collimated ray projected from the optical element 20 enters the optical system 21. Thus, an accurate light distribution can be obtained by the vehicle headlight device 100.

In the vehicle headlight device 100 according to Embodiment 1 of the present invention, the control circuit 60 controls the rotation angle f of first wedge prism so that |d|≤|k| is established. Thus, the vehicle headlight device 100 giving small burden to the rolling mechanism 50 and having a downsized configuration can be obtained. The angle d is the vehicle bank angle d. When a surface is defined to be located in the front side of vehicle, to have a predetermined distance Z from the vehicle, and to be perpendicular to the vehicle traveling direction, the origin $O_3$ is a position on the surface where the main ray projected from the center of light source 211 reaches. The x-axis is the straight line that passes the origin $O_3$ and that is parallel to the horizon 2006, and the y-axis is the straight line that passes the origin $O_3$ and that is orthogonal to the x-axis. The coordinate of illumination position illuminated by the ray that is deflected by the optical system 21 is the coordinate (X, Y). The angle between the x-axis and the straight line that connects the coordinate (X, Y) and the origin $O_3$ is the angle k.

In the vehicle headlight device 100 according to Embodiment 1 of the present invention, the control circuit 60 may employ a control method shown below, other than the above-described method. The control circuit 60 calculates the rotation amount $f_{max}$ of first wedge prism when the vehicle maximum bank angle $d_{max}$ has the relationship of |k|=|$d_{max}$|. The control circuit 60 calculates the rotation amount $f_u$ per unit bank angle of first wedge prism as a value obtained by dividing the rotation amount $f_{max}$ by the maximum bank angle $d_{max}$ ($f_u = f_{max}/d_{max}$). The control circuit 60 controls the first wedge prism 30, in a direction opposite to the vehicle bank direction, using the value obtained by multiplying the rotation amount $f_u$ per unit bank angle by the bank angle d of vehicle being tilted. Therefore, the linear control can be applied to the control circuit 60 and the control can be simplified.

The vehicle headlight device 100 according to Embodiment 1 of the present invention may further include the second lamp 91. The second lamp 91 includes the light source 111 and optical element 80 for adjusting the light distribution of ray from the light source 111. The vehicle headlight device 100 can illuminate the front side of vehicle with the ray obtained by synthesizing the light distribution of ray projected from the first lamp 92 and the light distribution of ray projected from the second lamp 91. Thus, visibility of the driver during driving is increased.

The first lamp 92 illuminates the light distribution area with higher illuminance than the second lamp 91. The first lamp 92 illuminates the direction in which the line of sight of driver is directed. The second lamp 91 illuminates the wide area of front side of vehicle. Since the vehicle headlight device 100 illuminates the direction in which the line of sight of driver is directed with high illuminance, visibility of the driver during driving is further increased.

In Embodiment 1, the first wedge prism 30 and the second wedge prism 40 are disposed so that their surfaces perpendicular to the optical axis C face each other. However, the facing surfaces of first wedge prism 30 and second wedge prism 40 should not be necessarily disposed to be perpendicular to the optical axis. The facing surfaces of first wedge prism 30 and second wedge prism 40 may be disposed so as to be tilted with respect to the optical axis C. If the wedge prisms 30, 40 are disposed so as to be tilted with respect to the optical axis C, a ray having a tilted light distribution is projected compared to the case where the wedge prisms 30, 40 are disposed so as to be perpendicular to the optical axis C. Thus, an advantage is obtained when the vehicle headlight device 100 is demanded to be disposed so as to be tilted with respect to the front side direction of vehicle. However, since the rotation axes of wedge prisms 30, 40 are tilted, more complicated control is needed compared to the case of non-tilting rotation axes. Also, considering the tilting angle management of wedge prisms 30, 40, etc., productivity is decreased. In such a case that the light distribution is demanded to be tilted, there may be an alternative of disposing the vehicle headlight device 100 itself in a tilted manner. There may be a case where such an alternative can be applied easily.

Embodiment 2

Figure 15:
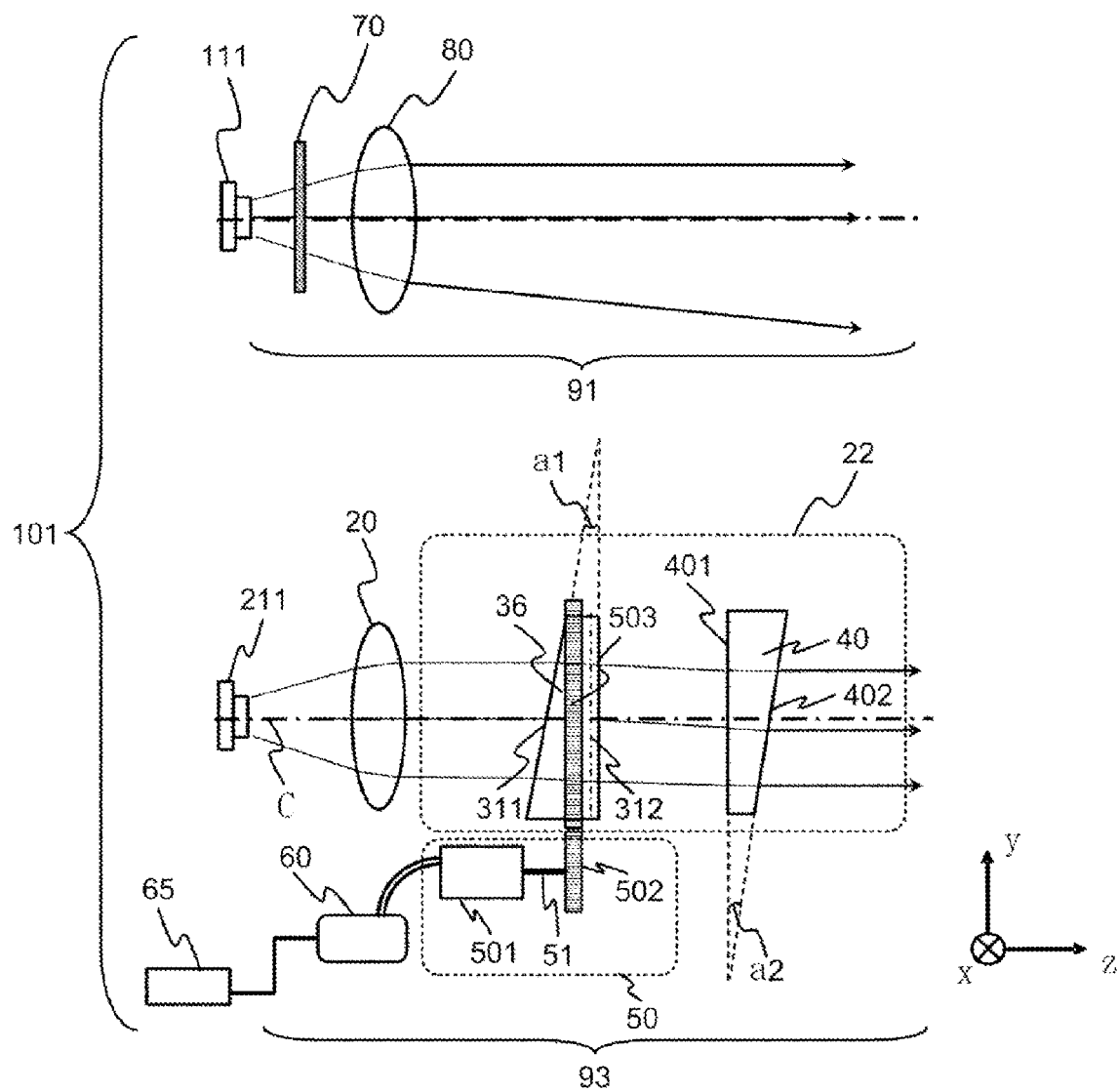
FIG. 15 is a diagram schematically showing a configuration of a headlight device according to Embodiment 2 of the present invention.

FIG. 15 is a diagram schematically showing a configuration of a vehicle headlight device 101 according to Embodiment 2 of the present invention. As shown in FIG. 15, the vehicle headlight device 101 according to Embodiment 2 is configured with two lamps, i.e. the lamp 91 and a lamp 93. The difference from Embodiment 1 is that an emission surface 312 of a wedge prism 36 is a cylindrical surface. That is, the vehicle headlight device 101 according to Embodiment 2 employs the wedge prism 36 having a shape in which the emission surface 302 of wedge prism 30 in Embodiment 1 is changed to the cylindrical surface.

As described above, while a wedge prism employs flat surfaces as its two refractive surfaces in general, "wedge prism" shown here includes a case of employing a curved surface as its refractive surface. A wedge prism is used so that one of its refractive surfaces is disposed to be perpendicular to the optical axis. A wedge prism is used so that the optical axis or the axis parallel to the optical axis is rotated as the rotation axis. When a curved surface is employed as the refractive surface, "surface perpendicular to optical axis" means that a tangential plane at a point where the rotating axis intersects with the refractive surface is perpendicular to the optical axis.

The wedge prism 36 is rotated by the rolling mechanism 50. The emission surface 312 corresponds to the emission surface 302 of wedge prism 30 shown in FIG. 1. The emission surface 302 is a surface perpendicular to the optical axis C. The cylindrical surface is a kind of toroidal surface. "Toroidal surface" is a lens whose curvature in the x-axis direction differs from that in the y-axis direction in FIG. 15. "Cylindrical surface" is a surface that has refractive power for convergence or divergence in one direction and that has no refractive power in a direction orthogonal thereto.

Configuring elements similar to those of vehicle headlight device 100 explained in Embodiment 1 are indicated by the same reference numerals, and the explanation thereof will be skipped. Configuring elements similar to those of vehicle headlight device 100 are the lamp 91 (light source 111, douser 70, and optical element 80), light source 211, optical element 20, wedge prism 40, rolling mechanism 50 (drive source 501, driving shaft 51, and gear 502), gear 503, and control circuit 60. Note that, while reference numerals different from those in the incident surface 301 are employed in the incident surface 311 of wedge prism 36, the configuration and function thereof is the same with those of incident surface 301.

Figure 16:
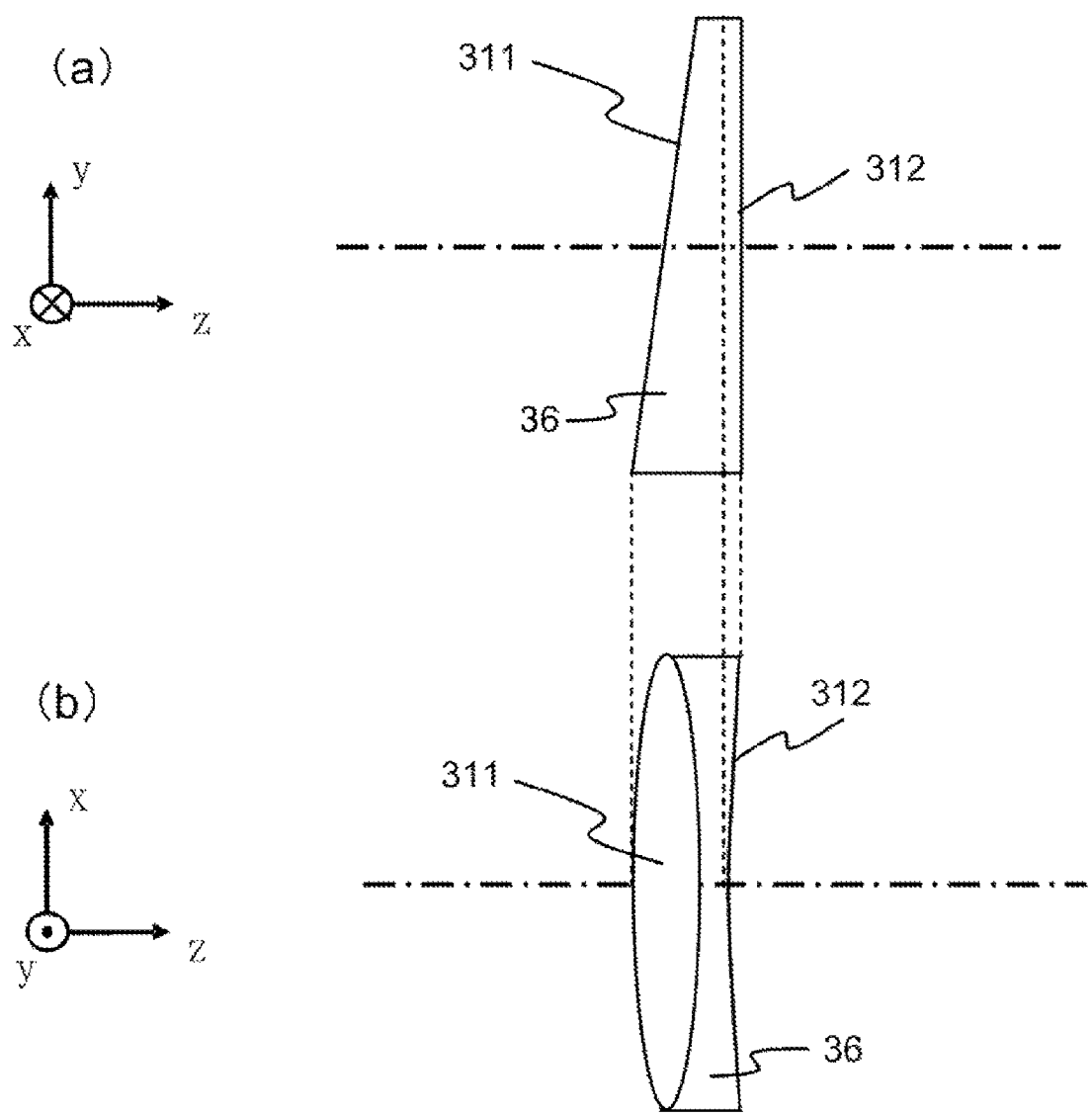
FIG. 16 is a diagram explaining a wedge prism of the headlight device according to Embodiment 2 of the present invention.

FIG. 16 is a diagram explaining the wedge prism 36 of vehicle headlight device 101. As shown in FIG. 16, the emission surface 312 of wedge prism 36 is a cylindrical surface having minus power only in the x-axis direction. (a) in FIG. 16 is a side view of the wedge prism 36, i.e. a diagram when viewed from the −x-axis direction. (b) in FIG. 16 is a plan view of the wedge prism 36, i.e. a diagram when viewed from the +y-axis direction.

Figure 17:
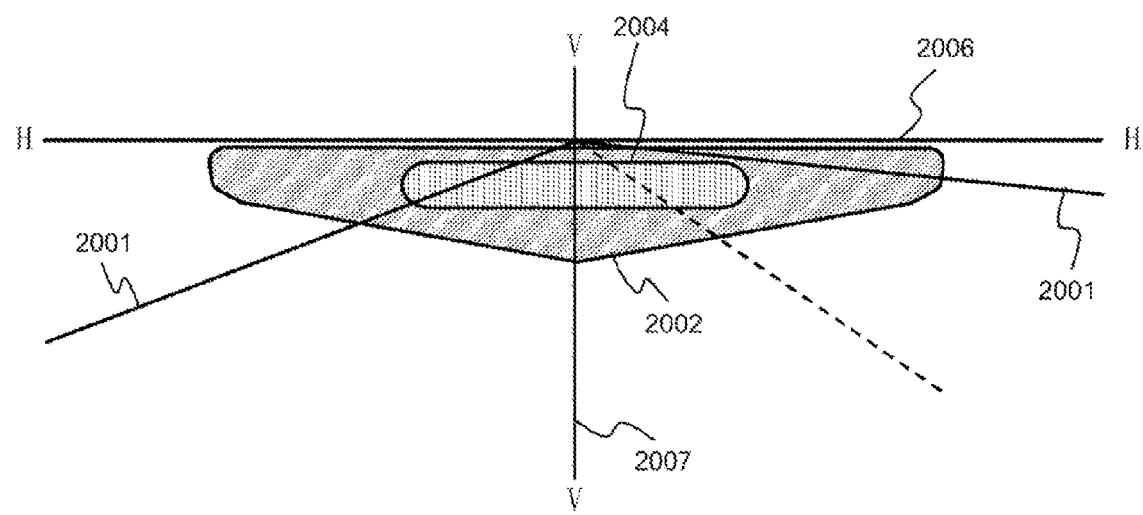
FIG. 17 is a diagram explaining a light distribution area of the headlight device according to Embodiment 2 of the present invention.

FIG. 17 is a diagram explaining a light distribution area of the vehicle headlight device 101. FIG. 17 shows a light distribution according to Embodiment 2 when the vehicle goes straight ahead. As shown in FIG. 17, when the vehicle goes straight ahead, a high illuminance area 2004 having a large dimension in the width direction is obtained. "Width direction" is the direction of horizon 2006. That is, "width direction" is the horizontal direction. This is because the light distribution of ray entering the wedge prism 36 is broadened in the horizontal direction by a lens function of the cylindrical surface of emission surface 312 in the wedge prism 36. "Lens function" is a function of bending a ray.

Figure 18:
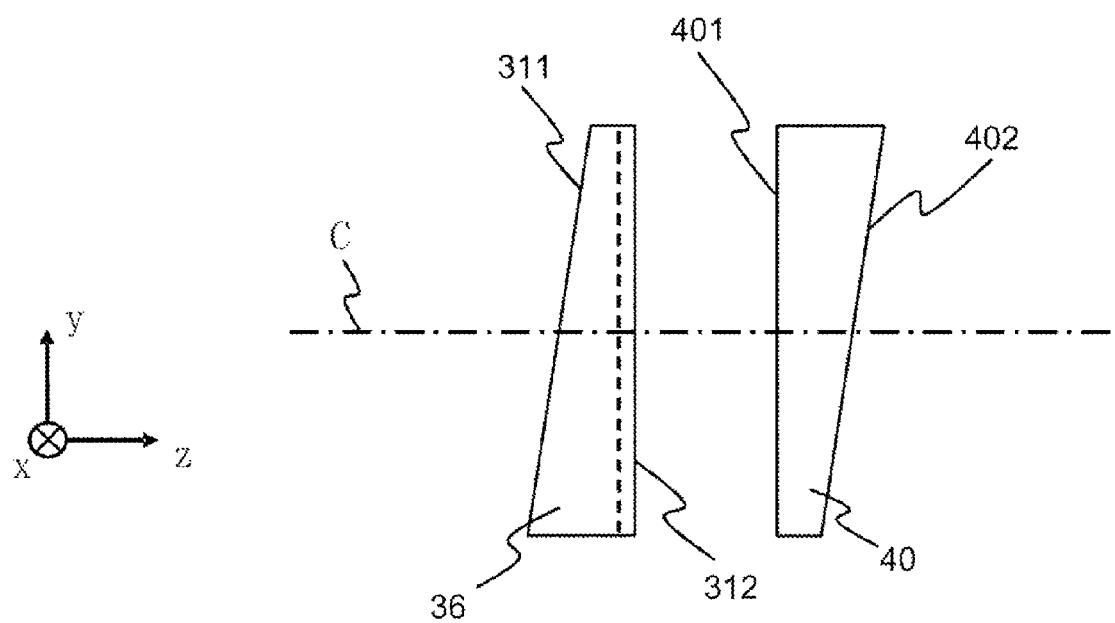
FIG. 18 is a diagram explaining a configuration of another wedge prism of the headlight device according to Embodiment 2 of the present invention.

FIG. 18 is a diagram explaining a configuration of the wedge prisms 36, 40 of vehicle headlight device 101. FIG. 18 shows a disposition of the wedge prism 36 and wedge prism 40 in Embodiment 2.

The ray enters the wedge prism 36 through the incident surface 311 from the −z-axis direction. The incident surface 311 is tilted with respect to a surface perpendicular to the optical axis C. In FIG. 18, the incident surface 311 is a surface rotated clockwise with respect to the surface perpendicular to the optical axis C when viewed from the −x-axis direction. The incident surface 311 is a flat surface.

The ray entering the wedge prism 360 through the incident surface 311 is projected from the emission surface 312. The emission surface 312 is a cylindrical surface having curvature only in the x-axis direction. The divergence angle only in the x-axis direction is broadened when the ray transmits the emission surface 312. "Divergence angle" is a broadening angle of the ray.

The ray projected from the emission surface 312 of wedge prism 36 enters the wedge prism 401 through the incident surface 401. The emission surface 312 and the incident surface 401 are disposed so as to face each other. The incident surface 401 is a surface parallel to the surface perpendicular to the optical axis C. The incident surface 401 is a flat surface.

The ray entering the wedge prism 40 through the incident surface 401 is projected from the emission surface 402. The emission surface 402 is tilted with respect to the surface perpendicular to the optical axis C. In FIG. 18, it is a surface rotated clockwise with respect to the surface perpendicular to the optical axis C when viewed from the −x-axis direction. The emission surface 402 is a flat surface. In FIG. 18, the incident surface 311 and emission surface 402 are surfaces being parallel with each other. That is, a tilt angle of the incident surface 311 and a tilt angle of the emission surface 402, with respect to the surface perpendicular to the optical axis C, are the same.

Figure 19:
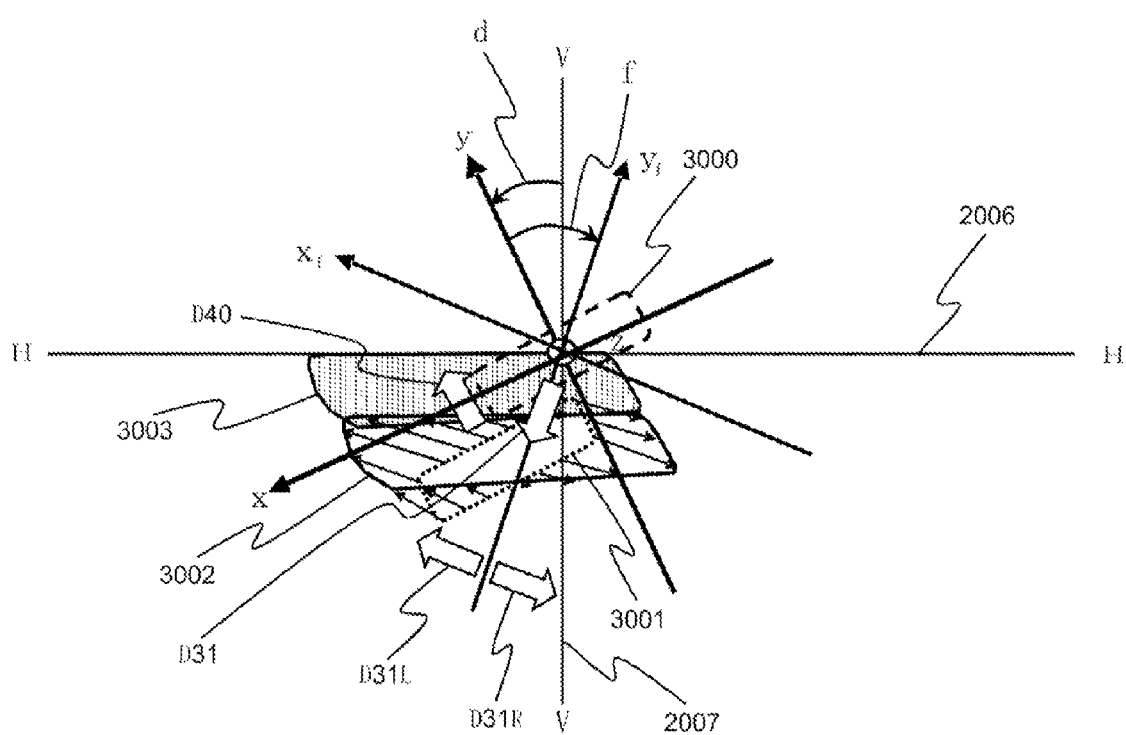
FIG. 19 is a diagram explaining a light distribution shape of the headlight device according to Embodiment 2 of the present invention.

FIG. 19 is a diagram explaining a light distribution shape of the vehicle headlight device 101. FIG. 19 shows how a high illuminance area 3003 is formed. When the vehicle goes through a curve, a ray projected from the light source 211 is collimated by the optical element 20. The collimated ray forms the high illuminance area 3003 by the wedge prism 36 and wedge prism 40. Hereinafter, how the high illuminance area 3003 is formed will be explained.

Now, a case will be presented in which the vehicle body is tilted counterclockwise by the bank angle d, as shown in FIG. 19. When an emission surface of the light source 211 has a horizontally-long rectangle shape, a ray having a shape of a light distribution 3000 shown in FIG. 19 enters the wedge prism 36 through the incident surface 311 shown in FIG. 18. The light distribution 3000 has the horizontally-long rectangle shape having a large width in the x-axis direction in the x-y-z coordinate system of vehicle body. The light distribution 3000 is indicated by the rough broken line in FIG. 19. Here, "horizontally-long" means that the length of light distribution in the x-axis direction is longer than the length thereof in the y-axis direction.

Since the wedge prism 36 is rotated in a direction opposite to the bank angle d by a desired rotation angle f, the ray transmitting through the incident surface 311 is deflected in a direction of a deflection vector D31 of the wedge prism 36. Here, the x-y-z coordinate system being rotated clockwise about the z-axis by the rotation angle f when viewed from the −z-axis direction is defined as the $x_f$-$y_f$-z coordinate system. The direction of deflection vector D31 coincides with the −$y_f$-axis direction. If the emission surface 312 of wedge prism 36 is supposed not to have a cylindrical surface, the light distribution shape is shown by a light distribution 3001 in FIG. 19. The light distribution 3001 is obtained by translating the light distribution 3000 in the −$y_f$-axis direction. The light distribution 3001 is indicated by the fine broken line in FIG. 19.

However, the emission surface 312 of wedge prism 36 has a cylindrical surface. Thus, the ray projected from the emission surface 312 is deflected in a direction of a deflection vector D31R or a deflection vector D31L which has different magnitude depending on a position. The direction of deflection vector D31R coincides with the −$x_f$-axis direction. The direction of deflection vector D31L coincides with the +$x_f$-axis direction. Thus, the light distribution 3001 is deformed to be a light distribution 3002 when the ray transmits through and is projected from the emission surface 312. The light distribution 3002 has a light distribution shape whose upper hem and lower hem are substantially parallel to the straight line 2006 being parallel to the ground (horizon). In the light distribution 3001, a shift amount, in the $x_f$-axis direction, of a point located close to the $y_f$-axis is smaller than a shift amount, in the $x_f$-axis direction, of a point located far from the $y_f$-axis. Therefore, the light distribution 3002 has a parallelogram shape.

The ray projected from the emission surface 312 of wedge prism 36 is further deflected by the wedge prism 40 in a direction of the deflection vector D40. The direction of deflection vector D40 coincides with the +y-axis direction. Then, the high illuminance area 3003 is formed.

Figure 20:
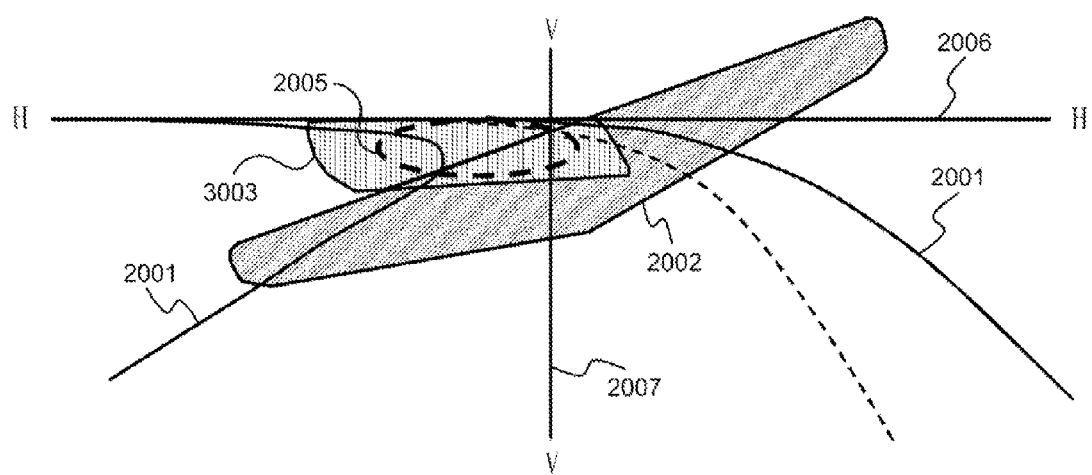
FIG. 20 is another diagram explaining the light distribution area of the headlight device according to Embodiment 2 of the present invention.

FIG. 20 is a diagram explaining a light distribution area of the vehicle headlight device 101. FIG. 20 shows a light distribution area in Embodiment 2 when the vehicle goes through a curve. In this case, the wedge prism 36 of lamp 93 is rotated by the rotation angle f in accordance with the bank angle d, similar to the lamp 92 according to Embodiment 1.

The emission surface 312 of wedge prism 36 has a cylindrical surface. Thus, when the vehicle goes through a curve, the shape of high illuminance area is changed from the shape of high illuminance area 2004 shown in FIG. 17 to the shape of high illuminance area 3003 shown in FIG. 20. The shape of high illuminance area 2004 (FIG. 17) is a light distribution shape when the vehicle goes straight ahead. The shape of high illuminance area 3003 (FIG. 20) is a light distribution shape when the vehicle goes through a curve. As shown in FIG. 20, the ray in high illuminance area 3003 effectively illuminates the driver's line-of-sight area at turning 2005.

That is, in the vehicle headlight device 100 according to Embodiment 1, the ray in high illuminance area 2003 cannot illuminate all of the driver's line-of-sight area at turning 2005, as shown in (b) in FIG. 13. On the other hand, in the vehicle headlight device 101 according to Embodiment 2, the ray in high illuminance area 3003 can illuminate all of the driver's line-of-sight area at turning 2005, as shown in FIG. 20.

According to Embodiment 2, the wedge prism 36 has a function of broadening the width of light distribution of the high illuminance area 2003 shown in Embodiment 1. In addition, when the vehicle goes through a curve, the shape of high illuminance area 2003 shown in Embodiment 1 is changed to an optimum shape by using a lens function of the cylindrical surface (emission surface) 312. Thus, the vehicle headlight device 101 can effectively illuminate the driver's line-of-sight area at turning 2005. That is, in the vehicle headlight device 101, the ray in high illuminance area 3003 can illuminate all of the driver's line-of-sight area at turning 2005.

Figure 21:
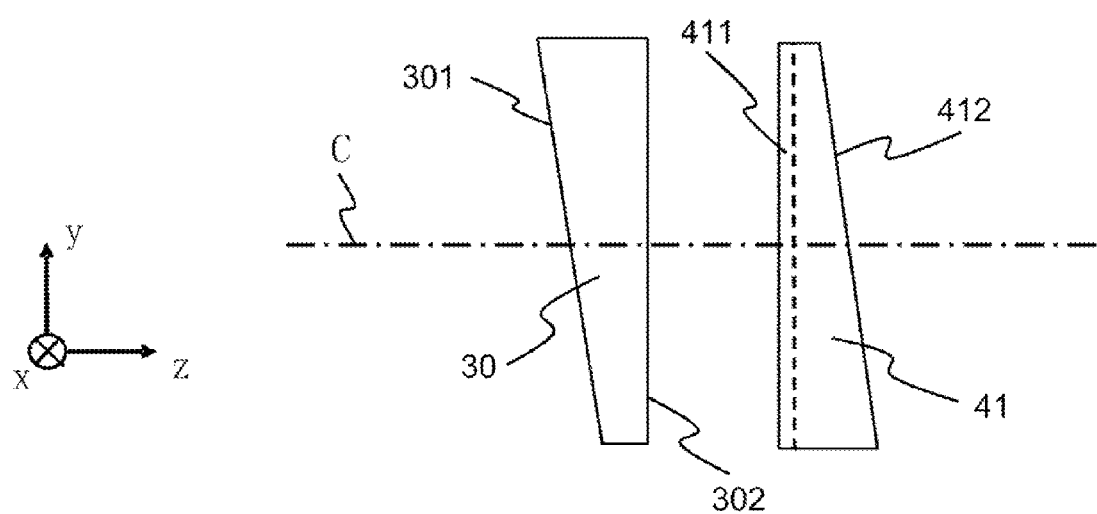
FIG. 21 is a diagram explaining a configuration of another wedge prism of the headlight device according to Embodiment 2 of the present invention.

In a reference state of the headlight device 101 according to Embodiment 2 when the vehicle goes straight ahead, the wedge prism 36 and wedge prism 40 are disposed as shown in FIG. 18. However, a reference state of rotating both of the wedge prism 36 and wedge prism 40 about the z-axis (axis parallel to optical axis C) by 180 degrees may be employed, as shown in FIG. 21.

In that case, the wedge prism 30 is disposed instead of the wedge prism 36. That is, the emission surface 312 having a cylindrical surface is replaced by the emission surface 301 having a flat surface. In addition, the wedge prism 41 is disposed instead of the wedge prism 40. The incident surface 411 of wedge prism 41 has a cylindrical surface. That is, the incident surface 401 having a flat surface is replaced by the incident surface 411 having a cylindrical surface. Note that the rolling mechanism 50 in this case needs to drive the wedge prism 41 instead of the wedge prism 30. An operation of the rolling mechanism 50 for driving the wedge prism 41 and an operation of the controller 60 for controlling the rolling mechanism 50 are similar to those in the case of wedge prisms 36, 40 shown in FIG. 18.

In Embodiment 2, the emission surface 312 of wedge prism 36 or the incident surface 411 of wedge prism 41 is assumed to have a cylindrical surface. The cylindrical surface is a kind of toroidal surface. However, it should not be limited to the cylindrical surface. The emission surface 312 or the incident surface 411 may employ a free-form surface such as a toroidal surface or an aspheric surface, as long as it can adequately deform the light distribution shape by rotating the wedge prism when the vehicle goes through a curve. "Aspheric surface" is a surface configured with a curved surface other than a spherical shape. For example, it is a surface that has a complicated surface shape whose curvature becomes small as moving away from the optical axis center, etc., and it is a parabolic surface or it has a surface that can be expressed by a polynomial (ellipsoid, hyperboloid, or four-dimensional curved surface). Here, an aspheric surface shape shows a surface shape having a curvature of toroidal surface or cylindrical surface. "Free-form surface" is a generic term of a surface having no rotation symmetry axis and is also called as a non-rotation symmetry surface.

In Embodiment 1 and Embodiment 2, devices each including two lamps are explained. That is, there are two lamps 91 and 92 in Embodiment 1. There are two lamps 91 and 93 in Embodiment 2. However, this is not a limitation. A single lamp may be employed in which either one of the lamp 92 for illuminating the high illuminance area 2003 or the lamp 93 for illuminating the high illuminance area 3003 is included. That is, it is a configuration without the lamp 91. Even in such a configuration, an effect of illuminating the driver's line-of-sight area at turning 2005 by the ray in high illuminance area 2003 or 3003 can be expected.

Also, as to the light source for each lamp, it should not be limited to the case where each lamp has the individual light source. There may be a case in which a single light source is shared and the ray is distributed to an optical path of the main light distribution area and an optical path of the high illuminance area by using an optical system.

In Embodiment 1 and Embodiment 2, the ray entering the optical systems 21, 22 is assumed to be a collimated ray. However, it should not to be limited to the collimated ray, and a ray having an angle may enter. "Ray having angle" is a ray that is tilted with respect to a surface perpendicular to the optical axis C. That is, a configuration is possible in which the lamps 92, 93 do not include the optical element 20. Even in that case, a destination where the illumination position P shifts can be accurately calculated by using the formula (12).

However, when the ray having an angle enters the optical systems 21, 22, the ray projected from the optical systems 21, 22 is diverged depending on the incident angle. If the ray projected from the optical systems 21, 22 has a divergence angle, some of the ray is directed above the horizon 2006 and may possibly dazzle oncoming drivers. Also, since the ray reaches the road surface located at a short distance, there is a possibility that the effect of illuminating the desired area (driver's line-of-sight area at turning 2005) is reduced. Considering the above-described adverse effects and the utilization efficiency of light, etc., it is desirable that the ray entering the optical systems 21, 22 is a collimated ray.

In the vehicle headlight device 101 according to Embodiment 2, each surface, perpendicular to the rotation axis, of the first wedge prisms 36, 41 is configured with a curved surface. The divergence angle of ray transmitting through the curved surface in the deflection direction D31 is smaller than the divergence angle in a direction orthogonal to the deflection direction. Thus, the ray in high illuminance area 3003 can illuminate all of the driver's line-of-sight area at turning 2005. In FIG. 19, the deflection direction D31 is parallel to the y-axis. "Divergence angle in deflection direction D31" is a divergence angle in the y-axis direction. That is, it is a divergence angle on the y-z plane. "Direction orthogonal to deflection direction" is parallel to the x-axis. That is, "divergence angle in direction orthogonal to deflection direction" is a divergence angle in the x-axis direction. That is, it is a divergence angle on the z-x plane.

Vehicles that include the vehicle headlight devices 100, 101 according to the above-described embodiments should not be limited to motorcycles. For example, the devices may be employed in motor tricycles. e.g. tricycles called as "GYRO". "Tricycles called as GYRO" is a scooter having three wheels configured with one front wheel and two rear wheels with one shaft. In Japan, it corresponds to a motorized bicycle. It has a driving shaft at around the vehicle center portion, and almost all the vehicle body including the front wheel and driver's seat can be tilted in the right and left direction. By using this mechanism, its center of gravity can be shifted toward the inner side when the vehicle goes through a curve, similar to a motorcycle.

In addition, the devices may be employed in four-wheeled vehicles. In a four-wheeled vehicle, the vehicle body tilts in the right direction when the vehicle goes through a left-hand curve, for example. The vehicle body tilts in the left direction when the vehicle goes through a right-hand curve. They are caused by centrifugal force. That is, it has a bank direction opposite to the motorcycle. However, in a four-wheeled vehicle, the high illuminance area can be also modified by detecting the vehicle body bank angle. Also, if the vehicle headlight device according to the present invention is employed in a four-wheeled vehicle, an adequate light distribution can be obtained by arbitrarily shifting the high illuminance area when the vehicle body is tilted in a case where the wheels of one side run on to an obstacle, etc.

In the present invention, each of the embodiments may be combined freely, or may be appropriately modified or omitted within the scope thereof.

Note that, while words such as "parallel" and "perpendicular" that indicate a positional relationship between parts or shapes of parts are used, they include a range when a manufacturing tolerance, a variation in assembly, and the like are considered.

Note that, while embodiments of the present invention are explained as above, the present invention should not be limited to these embodiments.

REFERENCE NUMERALS 100, 101 vehicle headlight devices; 111, 211 light sources; 20, 80 optical elements; 1, 30, 36, 40 wedge prisms; 11, 21, 31, 301, 311, 401 incident surfaces; 12, 22, 32, 302, 312, 402 emission surfaces; 50 rolling mechanism; 501 drive source; 503 gear; 60 control circuit; 65 vehicle body tilt detector; 91, 92, 93 lamps; a, a1, a2 wedge angles; d bank angle; f rotation angle; k tilt angle; C optical axis; P intersect position; CA conical angle; 2002 main light distribution area; 2003, 3003 high illuminance areas; 2005 driver's line-of-sight area at turning; 2006 horizon; and 2007 straight line perpendicular to the ground.

The invention claimed is:

1. A vehicle headlight device used for a vehicle, comprising
a first lamp that includes:
  a first light source that emits a ray;
  an optical system that has a first wedge prism and a second wedge prism for receiving, deflecting, and projecting the ray from the first light source;
  a rolling mechanism that rotates the first wedge prism about a rotation axis; and
  a control circuit that controls the rolling mechanism so as to rotate the first wedge prism, wherein
  the first wedge prism has a first refractive surface perpendicular to the rotation axis and a second refractive surface tilted with respect to the first refractive surface, the first wedge prism having an end at which a distance between the first refractive surface and the second refractive surface is smallest;
  the second wedge prism has a third refractive surface perpendicular to the rotation axis and a fourth refractive surface tilted with respect to the third refractive surface;
  an optical axis of the first light source passes through the first refractive surface and the second refractive surface of the first wedge prism;
  the first refractive surface and the second refractive surface of the first wedge prism are flat surfaces;
  the first refractive surface and the third refractive surface are disposed so as to face each other; and
  the control circuit controls the rolling mechanism so that the end of the first wedge prism is located on an opposite side of a road surface with respect to the optical axis of the first light source.

2. The vehicle headlight device in claim 1, wherein the control circuit controls the rolling mechanism in accordance with a bank angle d of the vehicle.

3. The vehicle headlight device in claim 2, wherein the control circuit controls the rolling mechanism so as to rotate the first wedge prism in a direction opposite to a bank direction.

4. The vehicle headlight device in claim 2, under the assumption that:
  an origin is a position on a surface where a main ray projected from a center of the first light source reaches, the surface being located in a front side of the vehicle, having a predetermined distance from the vehicle, and being perpendicular to a vehicle traveling direction;
  an x-axis is an axis that passes the origin and that is parallel to a horizon;
  a y-axis is an axis that passes the origin and that is orthogonal to the x-axis;
  a coordinate (X, Y), on an x-y coordinate that contains the x-axis and the y-axis on the surface, is a coordinate of an illumination position illuminated by the ray that is deflected by the optical system; and
  an angle k is an angle between the x-axis and a straight line that connects the coordinate (X, Y) and the origin, wherein
  the control circuit controls a rotation angle f of the first wedge prism so that the angle k and the bank angled of the vehicle satisfy a relationship of $|d|\leq|k|$.

5. The vehicle headlight device in claim 2, under the assumption that:
  an origin is a position on a surface where a main ray projected from a center of the first light source reaches, the surface being located in a front side of the vehicle, having a predetermined distance from the vehicle, and being perpendicular to a vehicle traveling direction;
  an x-axis is an axis that passes the origin and that is parallel to a horizon;
  a y-axis is an axis that passes the origin and that is orthogonal to the x-axis;
  a coordinate (X, Y), on an x-y coordinate that contains the x-axis and the y-axis on the surface, is a coordinate of an illumination position illuminated by the ray that is deflected by the optical system; and
  an angle k is an angle between the x-axis and a straight line that connects the coordinate (X, Y) and the origin, wherein
  the control circuit calculates a rotation amount $f_{max}$ of the first wedge prism when the angle k and a maximum bank angle $d_{max}$ of the vehicle satisfy a relationship of $|k|=|d_{max}|$, calculates a rotation amount $f_u$ per unit bank angle of the first wedge prism as a value of $f_u=f_{max}/d_{max}$, and controls the first wedge prism, in a direction opposite to a bank direction of the vehicle, using a value obtained by multiplying the rotation amount $f_u$ per unit bank angle by the bank angle d of the vehicle being tilted.

6. A vehicle headlight device used for a vehicle, comprising
a first lamp that includes:
  a first light source that emits a ray;
  an optical system that has a first wedge prism and a second wedge prism for receiving, deflecting, and projecting the ray from the first light source;
  a rolling mechanism that rotates the first wedge prism about a rotation axis; and
  a control circuit that controls the rolling mechanism so as to rotate the first wedge prism, wherein
  the first wedge prism and the second \\edge prism are disposed so that their surfaces perpendicular to the rotation axis face each other;
  the first wedge prism is disposed so that a wedge angle directs in a road surface direction and is disposed so as to be rotatable about the rotation axis; and
  a surface, which is perpendicular to the rotation axis, of the first wedge prism is configured with a curved surface, and a divergence angle of a ray transmitting through the curved surface in a deflection direction is smaller than a divergence angle in a direction orthogonal to the deflection direction.

7. The vehicle headlight device in claim 6, further comprising a second lamp that includes a second light source and a second optical element for adjusting a light distribution of a ray from the second light source, wherein the vehicle headlight device illuminates a front side of the vehicle with a ray obtained by synthesizing a light distribution of a ray projected from the first lamp and a light distribution of a ray projected from the second lamp.

8. The vehicle headlight device in claim 7, wherein the first lamp illuminates a light distribution area with higher illuminance than the second lamp.

* * * * *